US010594798B2

(12) United States Patent
Rodrigues Nascimento et al.

(10) Patent No.: US 10,594,798 B2
(45) Date of Patent: Mar. 17, 2020

(54) SYSTEMS AND METHODS FOR MANAGING CONTAINERS IN A NETWORK OF MOVING THINGS

(71) Applicant: Veniam, Inc., Mountain View, CA (US)

(72) Inventors: Dário Fernando Rodrigues Nascimento, Lisbon (PT); Rui Miguel Correia e Costa, Sintra (PT); João Luis Mineiro Ramos de Azevedo, Cascais (PT)

(73) Assignee: Veniam, Inc., Mountain View, CA (US)

( * ) Notice: Subject to any disclaimer, the term of this patent is extended or adjusted under 35 U.S.C. 154(b) by 458 days.

(21) Appl. No.: 15/616,337

(22) Filed: Jun. 7, 2017

(65) Prior Publication Data

US 2017/0366616 A1 Dec. 21, 2017

Related U.S. Application Data

(60) Provisional application No. 62/350,814, filed on Jun. 16, 2016.

(51) Int. Cl.
*H04L 29/08* (2006.01)
*H04W 4/38* (2018.01)
(Continued)

(52) U.S. Cl.
CPC .......... *H04L 67/125* (2013.01); *H04L 67/10* (2013.01); *H04L 67/12* (2013.01); *H04L 67/18* (2013.01); *H04L 67/34* (2013.01); *H04W 4/38* (2018.02); *H04W 4/44* (2018.02); *H04W 4/50* (2018.02); *H04W 4/70* (2018.02); *H04L 67/325* (2013.01)

(58) Field of Classification Search
None
See application file for complete search history.

(56) References Cited

U.S. PATENT DOCUMENTS 8,249,937 B2 * 8/2012 Chang ................ G06F 9/505
705/14.1
8,612,580 B2 * 12/2013 Gandhi ............... G06F 9/5027
709/224

(Continued)

OTHER PUBLICATIONS

Control method and system for operating application program on router and router'; Chinese Patent No. CN104270317A; 12 pages. (Machine translation by Google) [Retrieved from <https://patents.google.com/patent/CN104270317A/en> on Mar. 28, 2016.].

(Continued)

*Primary Examiner* — Backhean Tiv
(74) *Attorney, Agent, or Firm* — McAndrews, Held & Malloy, Ltd.

(57) ABSTRACT

Communication network architectures, systems, and methods for supporting a network of mobile nodes. Various aspects of this disclosure provide non-limiting examples of communication network architectures, systems, and methods for supporting a dynamically configurable communication network comprising a complex array of both static and moving communication nodes (e.g., an Internet of moving things). More specifically, systems and methods for managing containers in a network of moving things.

27 Claims, 15 Drawing Sheets

(51) Int. Cl.
H04W 4/50 (2018.01)
H04W 4/70 (2018.01)
H04W 4/44 (2018.01)

(56) References Cited

U.S. PATENT DOCUMENTS

| | | | | |
|---|---|---|---|---|
| 8,719,415 | B1* | 5/2014 | Sirota | G06F 9/5061 709/221 |
| 8,732,118 | B1* | 5/2014 | Cole | G06F 16/254 707/607 |
| 8,769,059 | B1* | 7/2014 | Chheda | H04L 41/0866 705/26.5 |
| 9,256,467 | B1* | 2/2016 | Singh | G06F 9/5077 |
| 9,614,784 | B1* | 4/2017 | Houston | H04L 47/822 |
| 9,626,710 | B1* | 4/2017 | Chheda | G06Q 30/0631 |
| 10,270,815 | B1* | 4/2019 | Roche | H04L 65/1069 |
| 2003/0074387 | A1* | 4/2003 | Tanaka | G06F 9/5038 718/103 |
| 2003/0154112 | A1* | 8/2003 | Neiman | G06F 9/5044 705/5 |
| 2003/0172139 | A1* | 9/2003 | Srinivasan | H04L 67/02 709/221 |
| 2003/0172175 | A1* | 9/2003 | McCormack | H04M 3/42136 709/232 |
| 2004/0083477 | A1* | 4/2004 | Acharya | G06F 9/4881 718/102 |
| 2006/0053216 | A1* | 3/2006 | Deokar | G06F 21/6218 709/223 |
| 2006/0069621 | A1* | 3/2006 | Chang | G06F 9/505 705/26.1 |
| 2007/0220505 | A1* | 9/2007 | Bukovec | G06F 8/60 717/168 |
| 2008/0051921 | A1* | 2/2008 | Nammatsu | G06Q 10/06 700/97 |
| 2008/0109799 | A1* | 5/2008 | Imamura | G06F 8/65 717/168 |
| 2008/0115143 | A1* | 5/2008 | Shimizu | G06F 9/5066 718/105 |
| 2008/0184241 | A1* | 7/2008 | Headrick | G06F 9/4843 718/102 |
| 2008/0184248 | A1* | 7/2008 | Barua | G06F 9/4843 718/104 |
| 2010/0082621 | A1* | 4/2010 | Krivopaltsev | H04L 41/12 707/736 |
| 2010/0131959 | A1* | 5/2010 | Spiers | G06F 9/50 718/105 |
| 2010/0333092 | A1* | 12/2010 | Stefansson | G06F 9/44505 718/100 |
| 2011/0202657 | A1* | 8/2011 | Chang | G06F 9/505 709/226 |
| 2012/0101749 | A1* | 4/2012 | Garrett | G01R 22/063 702/58 |
| 2012/0110582 | A1* | 5/2012 | Ferdous | G06F 11/3442 718/101 |
| 2012/0123886 | A1* | 5/2012 | Brown | G06Q 30/0601 705/26.1 |
| 2012/0215587 | A1* | 8/2012 | Chang | G06F 9/505 705/7.31 |
| 2012/0317578 | A1* | 12/2012 | Kansal | G06F 9/5077 718/104 |
| 2013/0103641 | A1* | 4/2013 | Rehman | G06F 3/048 707/609 |
| 2013/0159376 | A1* | 6/2013 | Moore | H04L 67/10 709/202 |
| 2013/0198386 | A1* | 8/2013 | Srikanth | G06F 9/5061 709/226 |
| 2013/0297801 | A1* | 11/2013 | Guest | G06F 16/958 709/226 |
| 2014/0095693 | A1* | 4/2014 | Apte | H04L 67/1008 709/224 |
| 2014/0101728 | A1* | 4/2014 | Defrance | H04L 12/2836 726/4 |
| 2015/0156132 | A1* | 6/2015 | Emejulu | H04L 47/70 709/226 |
| 2015/0355896 | A1* | 12/2015 | Benge | G06F 8/65 717/171 |
| 2016/0098292 | A1* | 4/2016 | Boutin | G06F 9/505 718/104 |
| 2016/0162004 | A1* | 6/2016 | Ljubuncic | G06F 9/5088 713/320 |
| 2016/0246586 | A1* | 8/2016 | Madanapalli | G06F 8/65 |
| 2016/0277269 | A1* | 9/2016 | Chakra | H04L 41/0853 |
| 2017/0109206 | A1* | 4/2017 | Wang | G06F 9/50 |
| 2017/0123929 | A1* | 5/2017 | Helleren | G06F 11/1441 |
| 2017/0366616 | A1* | 12/2017 | Rodrigues Nascimento | H04L 67/34 |
| 2018/0006905 | A1* | 1/2018 | Correia e Costa | H04L 41/5067 |
| 2018/0034936 | A1* | 2/2018 | Correia e Costa | H04L 67/34 |
| 2018/0039520 | A1* | 2/2018 | Lu | G06F 9/5027 |
| 2018/0053405 | A1* | 2/2018 | de Azevedo | G08G 1/0133 |
| 2018/0132121 | A1* | 5/2018 | Correia e Costa | H04L 67/22 |
| 2018/0132307 | A1* | 5/2018 | Almeida Neves | H04W 84/005 |
| 2018/0316764 | A1* | 11/2018 | Ferreira Gomes | H04W 4/38 |
| 2019/0090109 | A1* | 3/2019 | Moreira de Carvalho | H04W 4/50 |
| 2019/0090174 | A1* | 3/2019 | Rocci | H04W 4/40 |
| 2019/0173753 | A1* | 6/2019 | Correia e Costa | H04W 28/08 |

OTHER PUBLICATIONS

'Cisco Nexus 9000 Series NX-OS Programmability Guide, Release 6.x'; Cisco Systems, Inc.; First Published: Nov. 20, 2013; Last Modified: Jul. 6, 2016; 72 pages. [Retrieved from https://www.cisco.com/c/en/us/td/docs/switches/datacenter/nexus9000/sw/6-x/programmability/guide/b_Cisco_Nexus_9000_Series_NX-OS_Programmability_Guide.pdf on Sep. 6, 2017].

'The Container Story: Run your apps and tools natively on Cisco boxes'; Per Jensen; Cisco Systems, Inc; Jun. 2015; 48 pages. [Retrieved from https://www.cisco.com/c/dam/assets/global/DK/seminarer/pdfs/cisco_virtual_update_fog_computing_iox_update.pdf on Sep. 6, 2017].

\* cited by examiner

SYSTEMS AND METHODS FOR MANAGING CONTAINERS IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/350,814, filed on Jun. 16, 2016, and titled "Systems and Methods for Managing Containers in a Network of Moving Things," which is hereby incorporated herein by reference in its entirety. The present application is related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
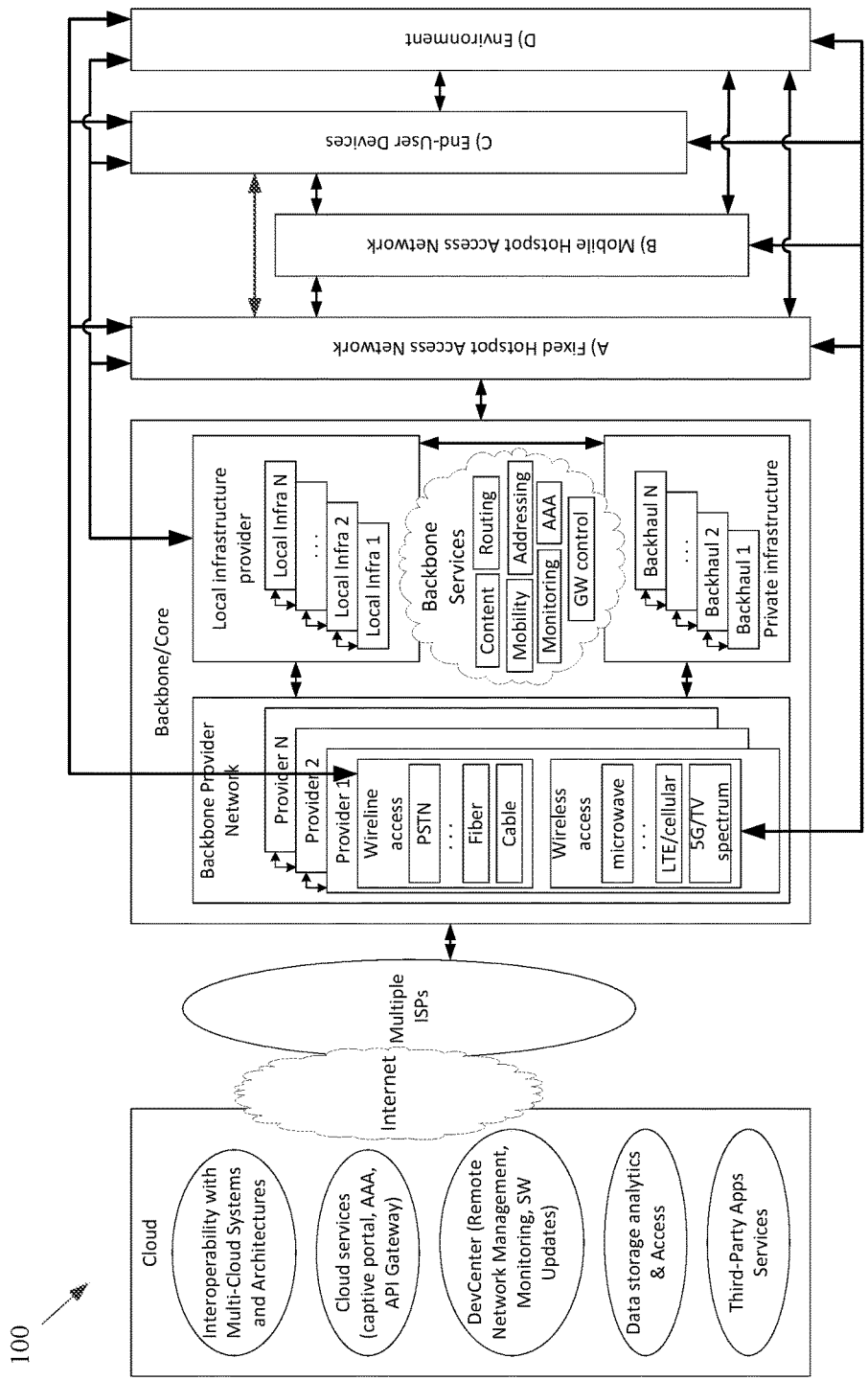
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using software containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a physical container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or mobility controller, MC, also referred to herein as a network controller (NC)) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise sensors on physical containers (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on physical containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an Application Programming Interface (API). For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital Internet Protocol (IP) networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
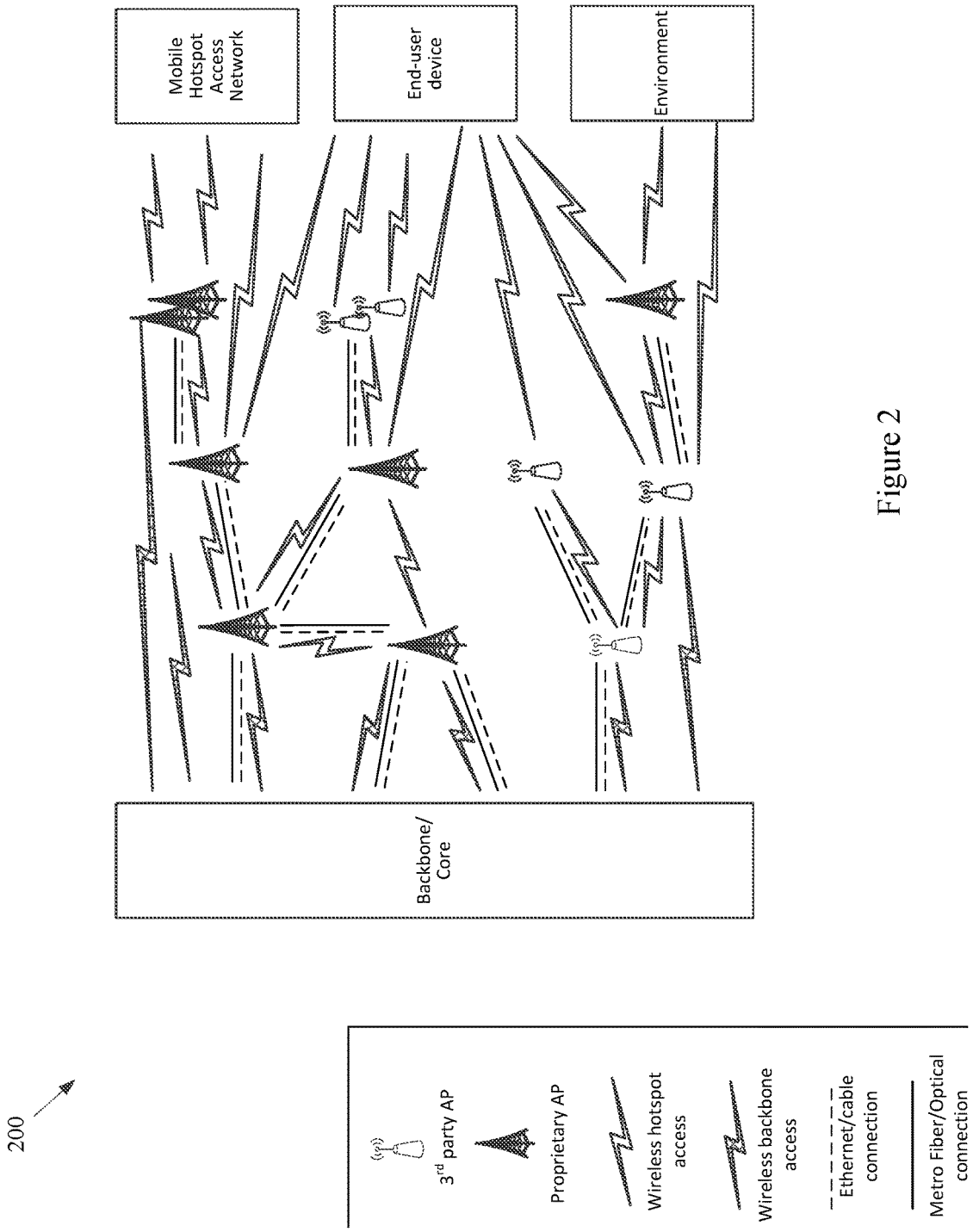
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and physical container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
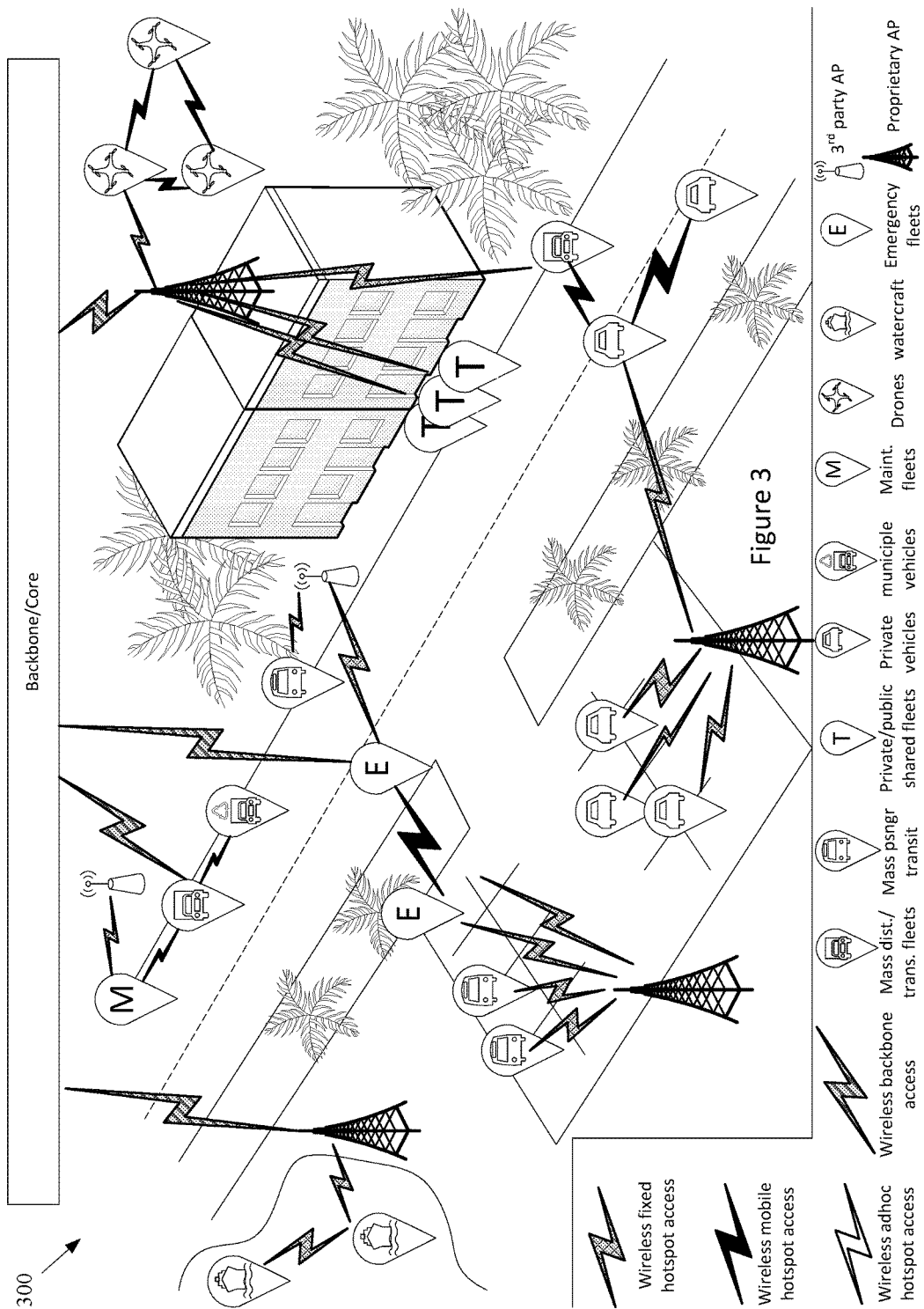
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
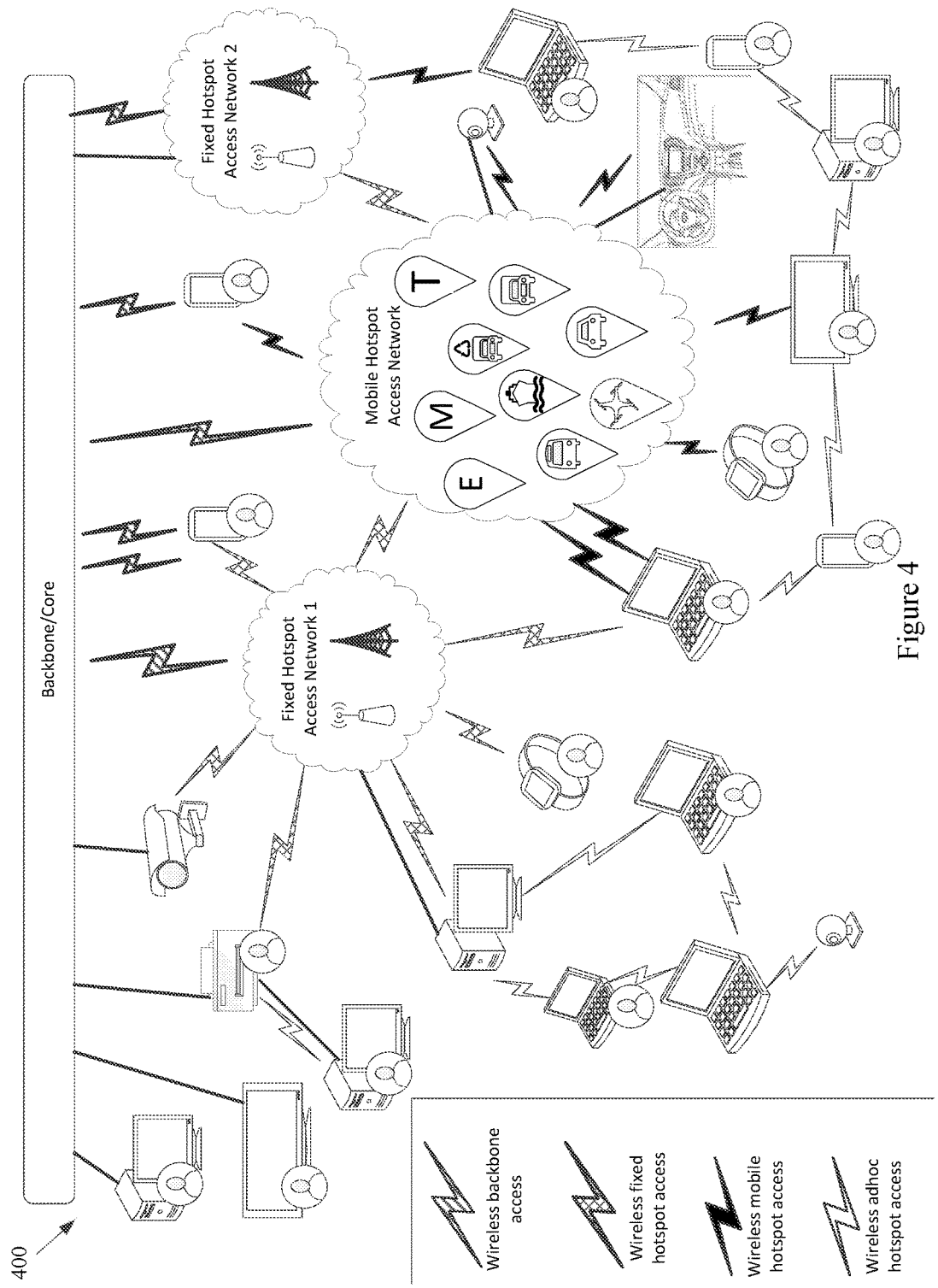
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
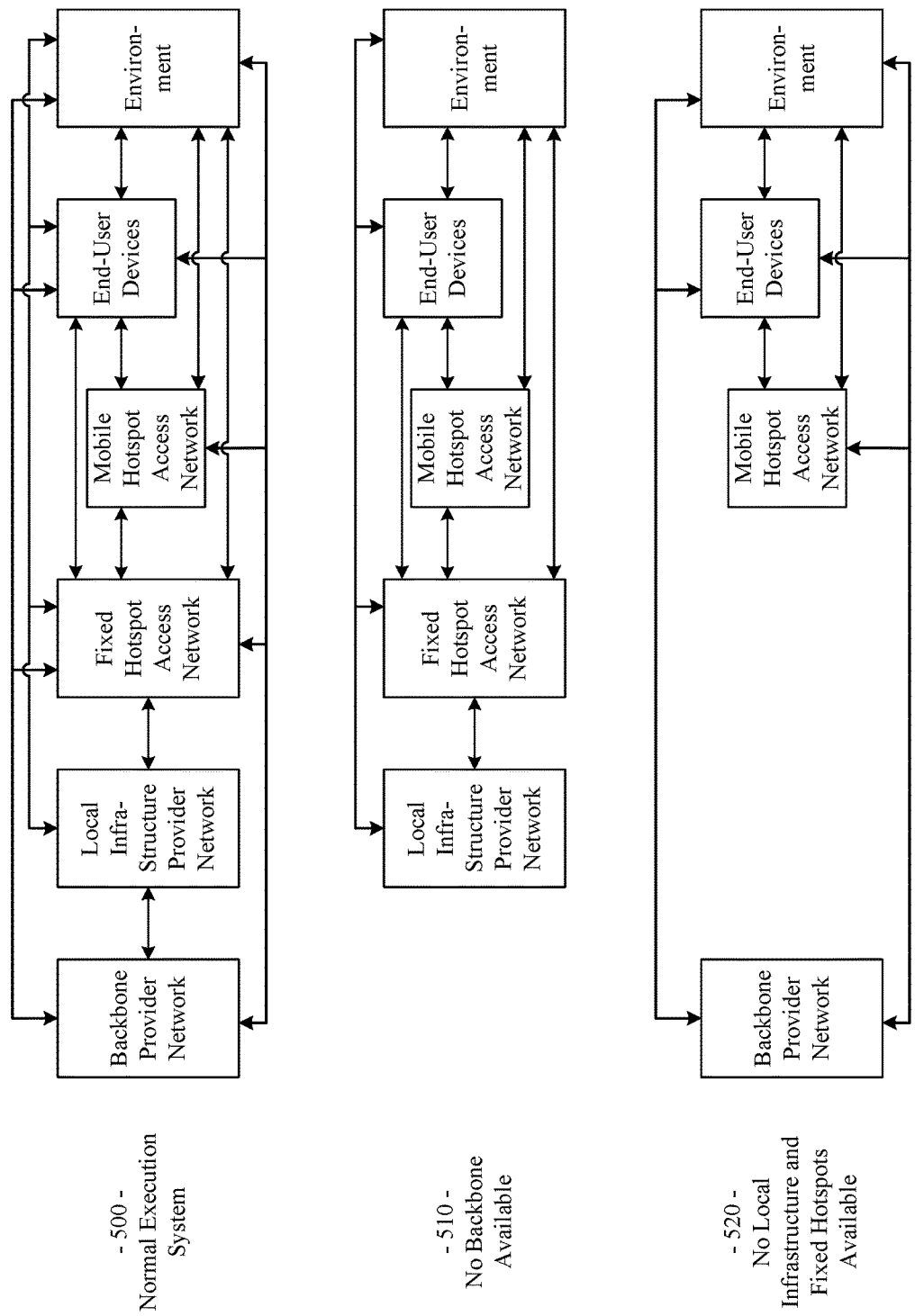
FIGS. 5A-5C show a plurality of network configurations illustrating the flexibility and/or and resiliency of a communication network, in accordance with various aspects of this disclosure.
Figure 5B:
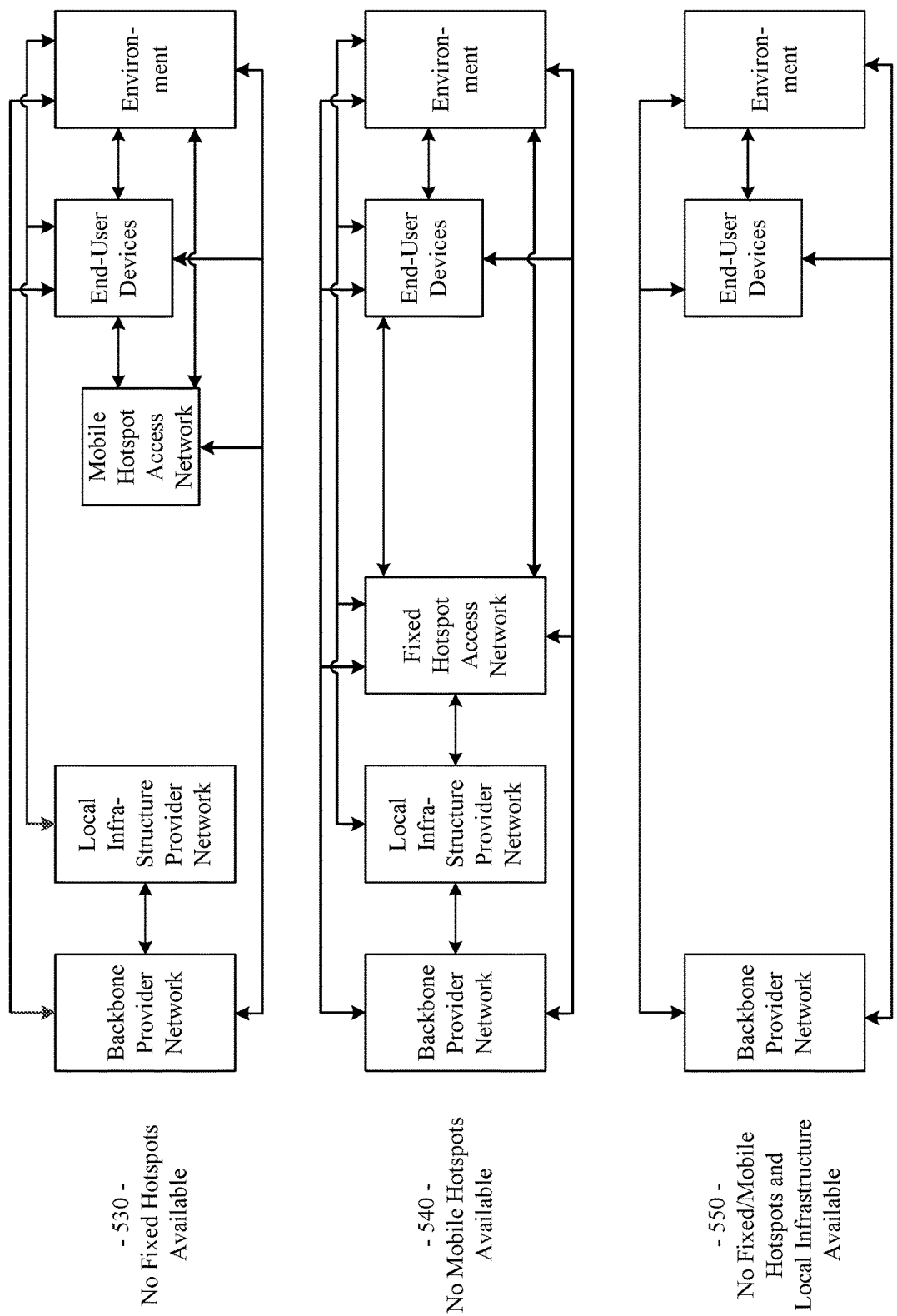
Figure 5C:
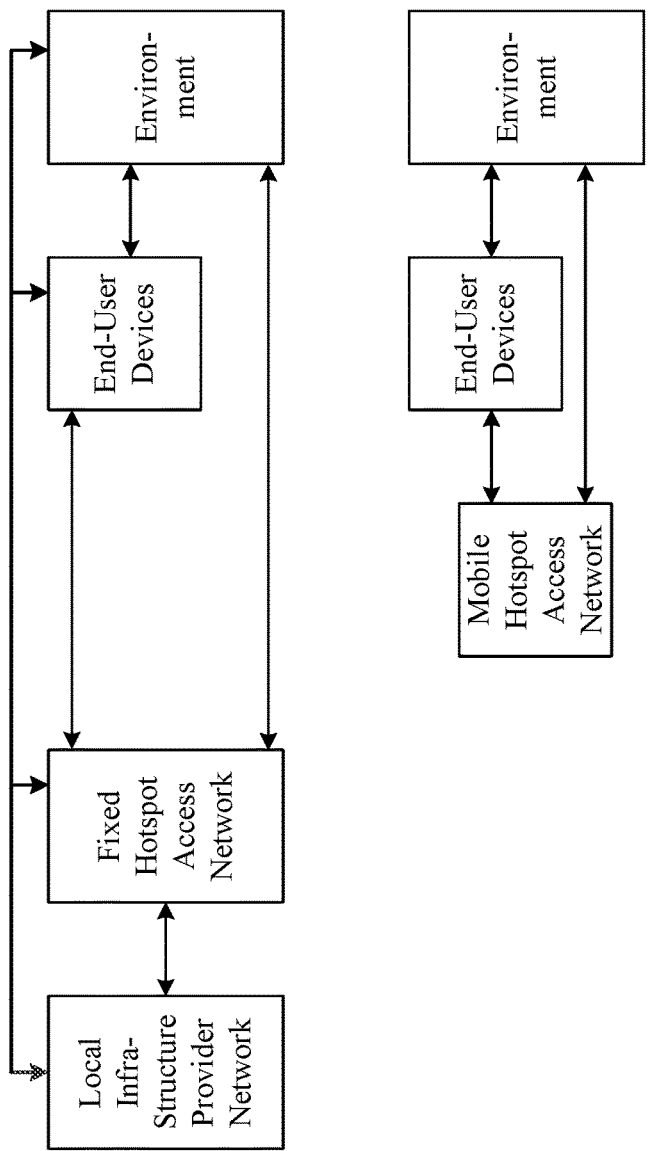

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
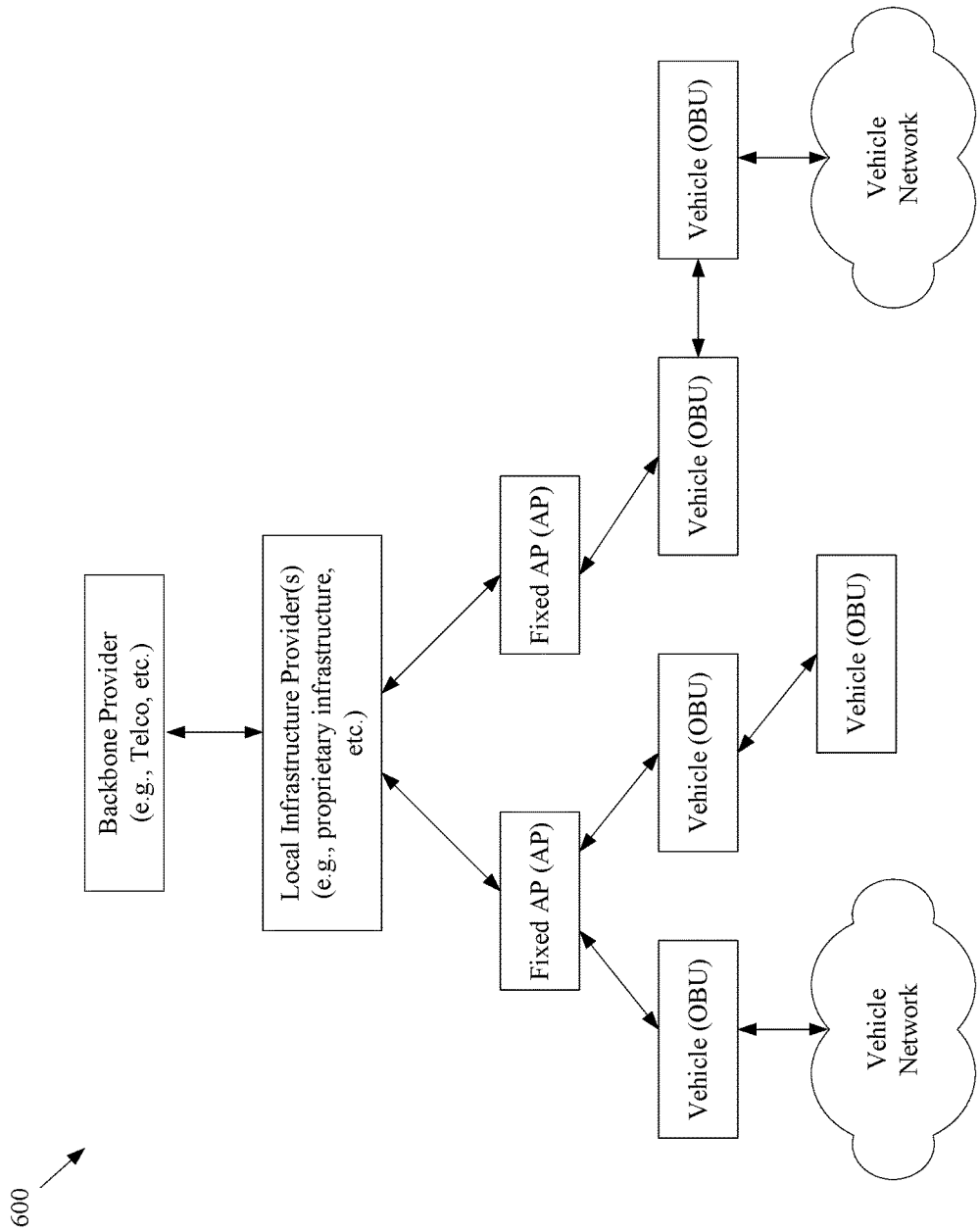
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

The development of "container-based" virtualization technologies such as Docker, LXC, LXD, and Rocket enables operating-system-level isolation of software applications running on the same operating system (OS, O/S). Such containers for virtualization of software applications as are discussed in the following disclosure as a "software container" or simply a "container" are distinct from and should not be confused with physical containers such as shipping containers, garbage containers, etc. Additional information about container-based technologies such as Docker, LXC, LXD, and Rocket is available from Docker, Inc., http://www.linuxcontainers.org, and CoreOS, Inc. Through the use of container-based virtualization technologies, several containerized software applications may run simultaneously on the same OS, having isolated inter-process communication, network communication, file system, users, and process identifiers (IDs). This use of containers permits the development and deployment of applications from multiple network partners in isolated environments. A container image (e.g., the binary data of a software container) for these technologies is generated according to respective container package standards such as, for example, those of the Open Container Initiative of The Linux Foundation®. Therefore, partners of a platform operator may develop and package software applications with little knowledge of the particulars of the platform on which the containerized software applications will be deployed.

An Internet of moving things in accordance with various aspects of the present disclosure may be a complex distributed system made of thousands of loosely connected network elements. Such network elements may be referred to herein as "nodes." Each node may run multiple software applications including, by way of example and not limitation, a software application for a delay-tolerant network (DTN), also referred to as a "disruption tolerant network," or a software application that collects geographic location information. The wide variety of software applications that may be used in an Internet of moving things, such as any of the examples described herein, may be developed by a number of distinct teams or partners. Network Units or network elements of such a communication network may be heterogeneous, and the network and network elements (e.g., fixed access points (FAPs), mobile access points (MAPs/OBUs), sensors, network controllers, etc.) may encompass several operating systems, processor architectures, and/or hardware versions.

A system according to various aspects of the present disclosure may employ a platform that eases the development, deployment, and management of software applications in large networks of loosely connected nodes. The example platform described herein uses containers to abstract the underlying environment and manages the complexity of resource allocation. A platform in accordance with the present disclosure has a variety of benefits including, for example, that software applications may be developed to run on a network element regardless of the hardware specifics of the platform(s) on which it is to run. In addition, such a platform enables software developers to develop software applications that have access to network and sensor data with low latency. Further, a platform in accordance with aspects of the present disclosure enables the operator(s) of a network of moving things to schedule applications to be deployed asynchronously, with different priority levels and policies. Execution of software applications may, for example, be constrained to run within a set of policies and priority levels such as, for example, enabling software applications to run only within a certain geographic area (i.e., geo-fencing), and permitting software applications having a relatively higher priority to obtain resources currently assigned to software applications having a relatively lower priority (e.g., in a case of "emergency signaling").

A platform in accordance with aspects of the present disclosure has additional benefits including, for example, the ability to enable the rollout of software updates and the performance of "hot-swapping" with what may be referred herein as "blue-green deployment," in which two different versions of software that are ready to run in a production mode may be simultaneously present on one or more network nodes. This enable an operator of such a network to easily and reliably apply configuration changes such as, for example, the swapping of one connection management algorithm (i.e., a "blue" version) for a different connection management algorithm (i.e., a "green" version), during network operation. In addition, by employing a platform as described herein, container images may run what may be referred to herein as "micro-operating systems," which may be a few megabytes in size, rather than typical operating systems that may occupy gigabytes of memory. When using such "micro-operating systems," resource usage may be lower than when "hardware virtualization" is used, which is of significant importance when employed in resource limited environments such as, for example, a network such as an Internet of moving things in accordance with aspects of the present disclosure. Aspects of the present disclosure also allow load-balancing, logging, and monitoring of software applications rather than of entire machines.

A network system in accordance with various aspects of the present disclosure may provide services that enable the scheduling, deployment, management, and monitoring of software applications across various network element platforms in, for example, network units (e.g., FAPs, MAPs, sensors, network controllers, etc.) of vehicular networks. Such a system may hide the complexity of resource management and fault handling and provide high reliability and high availability to software applications running across large numbers (e.g., hundreds or thousands) of heterogeneous nodes of a vehicular network, and may optimize resource usage in embedded systems (i.e., network elements such as MAPs/OBUs and/or FAPs/RSUs) in a vehicular network, which may have limited resources (e.g., processor speed/throughput and/or memory capacity), but may provide low latency. A system according to the present disclosure may simplify and improve software application and overall security by providing isolation of process instances. For example, a node or network element of such a system (e.g., MAPs, FAPs, sensors, NCs) may independently run two or more software applications (e.g., one to collect GNSS/GPS data and another to collect OBD-II (OBD2) data) in a manner in which a problem in one software application will not cause problems in other software applications, or the overall system. Such isolation enables such a system to support "multi-tenancy," in which multiple customers, also referred to herein as tenants, users, or subscribers of the network, may share the same mobile hardware (e.g., NUs (MAPs/OBUs, FAPs/RSUs, NCs)), where each tenant/customer may be allocated distinct amounts of resources of the network elements on which their software applications are executed. The power and flexibility of such an approach enables multiple parties/customer to concurrently run various software applications in a set of vehicle network elements/nodes, while also easing the upgrading of software applications running on those network nodes. In addition, such an approach eases the development and deployment of cross-platform/architecture applications, and enables the system to push applications from the Cloud (e.g., See FIG. 1) to the network nodes.

Figure 7:
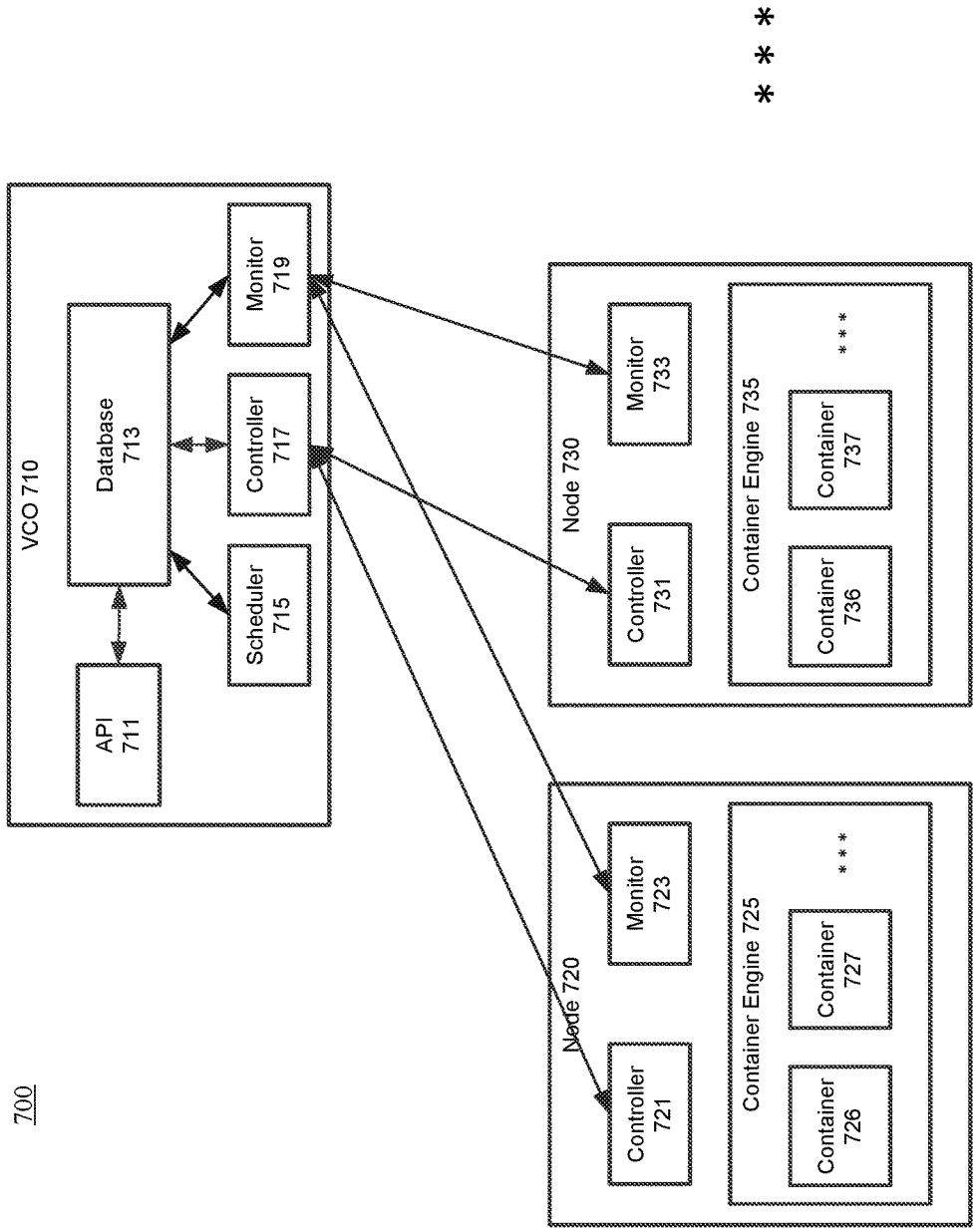
FIG. 7 is a block diagram of a vehicular network including a container manager referred to herein as a vehicular container orchestrator (VCO), which monitors, controls, and managing a network of loosely connected network element or nodes, in accordance with various aspects of the present disclosure.

FIG. 7 is a block diagram of a vehicular network 700 including an example container manager referred to herein as a vehicular container orchestrator (VCO) 710, which monitors, controls, and manages a network of loosely connected network element or nodes, in accordance with various aspects of the present disclosure. As shown in the example of FIG. 7, the VCO 710 of the vehicular network 700 may be a Cloud-based system that is located remote from and orchestrates operation of software applications residing on a number of network elements or nodes 720, 730 (e.g., OBUs/MAPs) that may each be located in a respective vehicle served by the vehicular network 700. Each of the nodes 720, 730 may be "loosely" connected to the VCO 710 via, for example, a cellular network, a Wi-Fi network (e.g., IEEE std 802.11 a/b/g/n/ac/ad/af), a Dedicated Short Range Communication (DSRC, e.g., IEEE std 802.11p) network, and/or TV network using "whitespace," and may communicate using, for example, what are referred to herein as a "DIRECT," "EPIDEMIC," and/or "OPPORTUNISTIC" modes of communication between the nodes 720, 730 and the VCO 710, and/or other nodes.

As illustrated in the example network of FIG. 7, the VCO 710 includes an API 711, a database 713, a scheduler 715, a controller 717, and a monitor 719. In accordance with various aspects of the present disclosure, the VCO 710 may track the state of each node (e.g., nodes 720, 730, etc.) in the vehicular network 700. Each of the nodes or network elements of a vehicular network according to the present disclosure, such as the nodes 720, 730 of vehicular network 700 of FIG. 7, may have what is referred to herein as a "current state" and a desired or "shadow" state. A distributed shared database such as, for example, the database 713 of FIG. 7, may be used to store the state information for the nodes of such a vehicular network, and may be used to notify a customer/subscriber using the services of the vehicular network 700 of any changes in the state of nodes of the vehicular network 700. It should be noted that although the example of FIG. 7 shows only two network elements or nodes (i.e., nodes 720, 730), the number of nodes shown in FIG. 7 does not represent a specific limitation of the present disclosure, in that a VCO may orchestrate (i.e., manage, monitor, and control) a greater (e.g., tens, hundreds, thousands, or more) or lesser number of nodes without departing from the scope of the present disclosure. It should also be noted that in accordance with various aspects of the present disclosure, each set of nodes of a vehicular network, such as the nodes 720, 730, etc. of vehicular network 700 of FIG. 7, may share a single VCO (e.g. VCO 710) having a single controller 717, a single scheduler 715, a single monitor 719, etc. In accordance with other aspects of the present disclosure, however, the controller 717, the scheduler 715, and the monitor 719 may, for example, be replicated, but there may be a single master controller, master scheduler, and master monitor in the network of moving things, at any given time.

As shown and discussed above with respect to FIG. 7, the example vehicular network 700 includes a number of nodes or network elements, represented as nodes 720, 730. Each of the example nodes 720, 730 of FIG. 7 include a controller, a monitor, and a container engine, represented in FIG. 7 by respective controllers 721, 731, monitors 723, 733, and container engines 725, 735 of the nodes 720, 730 of FIG. 7. The controller (e.g., controllers 721,731) of each of the nodes or network elements of a vehicular network in accordance with the present disclosure (e.g., nodes 720, 730 of FIG. 7) may locally apply state changes communicated to the node by the controller 717 of the VCO 710 to, for example, control the execution of software containers residing at the node. In addition, the monitor of each of the nodes of a vehicular network in accordance with the present disclosure (e.g., monitors 723, 733) may monitor the state of the containers residing on the respective node (e.g., containers 726, 727 and 736, 737) and may report such state information to the monitor 719 of the VCO 710.

When a customer/user/subscriber of the vehicular network 700 wants to deploy a new software application within the nodes of the vehicular network 700, the customer interacts with the VCO 710 via the API 711, by sending what may be referred to herein as a "Job Description" to the VCO 710. In accordance with various aspects of the present disclosure, the term "Job" as used herein may refer to a "software application." The term "software application" may be used herein to refer to a "main" routine and zero or more functions/subroutines (other than O/S functionality) used by the "main" routine. In accordance with aspects of the present disclosure, the "software application" of a Job may be contained within a single "software container," and copies of the same "software container" may be distributed to all network nodes on which the "Job" is to run. In accordance with aspects of the present disclosure, the "priority" of a "Job" may refer to the priority of execution of the "software application" of the software container. In accordance with various aspects of the present disclosure, the assignment of resources to software containers running in different vehicular nodes may take into account the corresponding vehicular environments to optimize management of each software container. Upon receipt of the "Job Description," the API 711 processes the "Job Description" by analyzing/parsing the information in the "Job Description," and applies appropriate changes to what may be referred to herein as an "application list" that may be stored in the database 713. A scheduler such as, for example, the scheduler 715 then uses the information in the database 713 to identify the nodes in the vehicular network 700 that are affected by the "Job Description" (i.e., the nodes at which software applications of the job defined by the "Job Description" are to be executed), and updates the desired (i.e., "shadow") node state stored in the database 713. The controller 717 then performs actions to ensure the current state of the nodes affected by the "Job Description" meets/matches the desired node state by, for example, pushing new/updated configuration information to the affected nodes. In accordance with various aspects of the present disclosure, the controller(s) of each of the affected node(s) (e.g., controllers 721, 731 of nodes 720, 730) may then apply the new/updated configuration to their respective nodes. Following the update, the monitor of each updated node (e.g., monitors 723, 733 of respective nodes 720, 730) may then push the new state of their respective nodes to the monitor 719 of the VCO 710, which may then update the current node state in the database 713.

In a system in accordance with various aspects of the present disclosure, customers/users/subscribers may interact with a VCO (e.g., VCO 710) by defining a "Job". A "Job" may include a set of one or more software containers, where each container has its own set of resource requirements and properties. Customers/users/subscribers may, for example, describe a "Job" using a declarative language to specify sets of one or more software containers that are to be co-allocated in a particular node (e.g., nodes 720, 730) of the vehicular network (e.g., vehicular network 700). Addition details are provided below that illustrate example elements of a "Job Description." Alternatively, the customers/users/subscribers may, for example, use a graphical user interface (GUI) to select one or more software containers to be co-allocated in a particular node of the vehicular network. In accordance with various aspects of the present disclosure, customers/users/subscribers may, for example, be provided with two methods via which they may pay for the use of resources of the vehicular network. Using a first method, for example, the customer/user/subscriber may buy resource credits in advance of the use, by a Job of the customer/user/subscriber of the resources of the network, a method that may be referred to herein as "prepay." In a second method, for example, the customer/user/subscriber may pay for usage of resources after the vehicular network resources for a Job are used, a method that may be referred to herein as "post-pay."

In accordance with various aspects of the present disclosure, prepaid credits may be offered at a lower price, because the purchase of prepaid credits permits the operator of a vehicular network (e.g., vehicular network 700) to predict usage of the network resources. The rate of consumption of resource credits by a Job, in either the prepaid or postpaid scenario, may be subject to a multiplier when the software application of the Job running on a node (e.g., software applications of containers 726, 727, 736, 737 of FIG. 7) is executing at a priority level other than a particular priority level (e.g., a priority level other than a priority level of say, 1). That is, software applications that run on a node at a priority level higher than other software applications may preempt the running of and therefore access to node resources by other software applications, and therefore may consume more resource credits for the amount of nodes resources used. In accordance with various aspects of the present disclosure, customers/users/subscribers may associate tags (e.g., key-value pairs) with each node, to ease the management of the nodes. For instance, tags may be used to identify the hardware version, vehicle type, and associated customer/user/subscriber.

A scheduler of a VCO in accordance with various aspects of the present disclosure such as, for example, the scheduler 715 of VCO 710 may operate, in part, to define the network nodes on which a given Job will run. To determine on which network nodes a given Job will run, and therefore the nodes on which the software containers associated with a Job will reside, the VCO may retrieve information about the node characteristics desired, from a Job Description File, such as that described above. The VCO may query its own database and/or a Cloud-based database, to identify network nodes having the desired characteristics. To enable a particular node to run a given Job, the characteristics of the particular node may be checked to verify that the characteristics of the particular node match the requirements and constraints of the Job Description, as discussed above. For example, the scheduler of the VCO (e.g., VCO 710 of FIG. 7) may, in part, verify that the particular node meets any requirements/constraints of the Job with regards to a number of characteristic including, for example, node geo-location (e.g., geo-fencing), node fleet context, and node network context. For example, node geo-location related requirements/constraints may include that the particular node be in proximity to a particular location (e.g., that the particular node be within a geo-fence defining "near" a fixed AP, within a particular depot, or only within an area defining the city "downtown") or in all places. For example, such restrictions/constraints may be used to process and offload data to the particular node with low latency and high throughput. In another example, restrictions/constraints may be defined that support distribution of a new campaign to nodes that support a set of outdoor advertising devices/equipment (e.g., audio or visual displays), or nodes that move within a specific city/controlled space. Requirements/constraints related to node fleet context may include, for example, an indication that the Job will involve software containers on all of the nodes that belong to a certain vehicle fleet, nodes on a specific transit (e.g., bus/metro/train) line, nodes in vehicles traveling at a particular speed or within a certain range of speeds, nodes in vehicles on a particular road (e.g. a particular highway, or a particular tunnel), and/or nodes in vehicles belonging to a particular customer/client of the operator of the network of moving things. Example requirements/constraints related to node network context may include, by way of illustration and not limitation, an indication of particular network interfaces that are available on a node (e.g., 3G, 4G, 5G, Long Term Evolution (LTE), Universal Mobile Telecommunications Service (UMTS) cellular, Wi-Fi (e.g., IEEE std 802.11a/b/g/n/ac/ad/af), DSRC, Bluetooth®, Zigbee®, etc.), an indication of the availability of a particular access point (e.g., a FAP or MAP), an indication of the availability of a certain guaranteed level of Quality of Service (QoS), an indication of a particular maximum data/packet latency time, an indication of the availability of a bit rate above a certain minimum value, an indication of a level of jitter below a certain maximum value, and/or an indication of a bit error rate that is below a certain maximum value. In addition, such requirements/constraints related to node network context may include, by way of example and not limitation, an Access Control List (ACL) indicating that access is allowed to a particular protocol, to particular communication ports, to particular Source/Destination IP address(es), that particular Container IDs or tags must be present, and/or that a particular address configuration must be present. Restrictions/constraints on resource usage may also be used to select nodes on which portions of a Job will be processed.

An algorithm for performing such a verification may first direct a scheduler (e.g., scheduler 715 of FIG. 7) to match tags or properties of each potential target node of the vehicular network (e.g., the collections of nodes of vehicular network 700) to corresponding fields of the Job Description such as, in this instance, the "Vehicular Network," "Client," and "Other tags" information of the "Target" field of the Job Description described above. Then, for each period of time during which the software application is to run (e.g., as defined by the dates and times of execution information in, for example, the "Constraints" field of the Job Description), the scheduler (e.g., scheduler 715) may verify that the software application of the Job is not defined to run on the potential target node simultaneously with any other software applications in the "revoke list" of the "Co-location Options" field of the Job Description. In addition, the scheduler (e.g., scheduler 715) may verify that the available resources of the potential target node are greater than the sum of the resource requirements of the software application of the current Job to be scheduled, when added to the resources currently allocated to software application of other jobs with a same or higher priority level as that of the Job being scheduled, during the applicable time period(s). In some instances in accordance with aspects of the present disclosure, customers/users/subscribers may force the scheduler (e.g., scheduler 715) to ignore the last validation. However, that may imply that the execution of a container is probabilistic, as mentioned above.

In accordance with various aspects of the present disclosure, for Jobs that may need to run over an entire fleet of vehicles (e.g., local "jobs" that are performed in proximity to a particular fixed AP or a particular sensor), the scheduler of the VCO (e.g., scheduler 715 of VCO 710) may determine and assign a probability that a particular node should carry a software container belonging to a specific Job. Such a probability may, for example, depend on the expected contact time of the particular node with a specific AP (e.g., FAP or MAP) or sensor, as well as the level of resources available, the vehicle speed, etc., and the probability may, for example, decrease with the number of other nodes that are already carrying software container(s) for that specific Job. In accordance with various aspects of the present disclosure, the scheduler of the VCO (e.g., scheduler 715 of VCO 710) may not ensure the execution of a given software container, and the execution of the given software container may be probabilistic due to external constraints. As a base line, in accordance with some aspects of the present disclosure, the VCO may compute the probability of execution of a software container on a particular node based on, for example, historical data and/or simulations of future conditions.

The VCO of a network of moving things in accordance with various aspects of the present disclosure (e.g., VCO 710 of FIG. 7) may, for example, be constantly updating a revenue metric related to the impact of a specific software container, deployed in a specific network node, upon the overall job performance. When the situation arises where, for example, the VCO needs to adjust the software containers for jobs running on a specific node because, for example, a high-priority job needs to be deployed on that specific node (e.g., specific "local" jobs running in nodes in proximity to a particular AP, or jobs that only run when there are more than a certain number of users or a specific group of users connected to a particular mobile AP), the software containers of jobs that experience less impact upon their overall job performance may be released (e.g., deallocated), or the resources assigned to those software containers may be decreased. In accordance with various aspects of the present disclosure, a wide variety of metrics may be used in the process of determining when and how to make adjustments to software containers for jobs running on each node of a network as described herein. This process may be managed by a local node controller since the node may be offline.

It should be noted that other constraints such as, for example, resource usage that results from "geo-fencing/geolocation" and "execution triggers" may not be predictable. The algorithm of a scheduler in accordance with various aspects of the present disclosure (e.g., scheduler 715) may, however, take into consideration the logs of past operation of each node to help prevent overload. For instance, the "geo-fencing/geolocation" activity of a node may be predictable, if the geographic route of the node is similar to past geographic routes.

In accordance with various aspects of the present disclosure, when a particular node becomes overloaded, jobs that are running on that particular node with a relatively higher priority may kill (e.g., cause termination of) jobs with a relatively lower priority, but such preemption may not necessarily cascade. That is, in such a situation, the scheduler (e.g., scheduler 715) may kill software applications (in software containers) of the lowest priority jobs running on the node, first. In accordance with aspects of the present disclosure, software applications having the lowest priority may, for example, run according to a "best effort" policy, while software applications having the highest priority may have a what may be referred to herein as a "warranty on scheduling." The term "warranty on scheduling" may, for example, refer to preemption, by the software application having the "warranty on scheduling," of the running of other software application(s). For instance, one may consider a scenario having two "priority levels." If, for example, the sum of the resources required by all software containers in the higher "priority level" is less than the available resources, then the software containers in the higher "priority level" may run, because software containers in the lower "priority level" may be "killed" or paused. In accordance with various aspects of the present disclosure, a job may also be preempted when, for example, a software application is terminated because the resource credits of the customer/user/subscriber owner of the job have been depleted or exhausted.

Nodes of a network of moving things according to various aspects of the present disclosure may support what may be referred to herein as a "make-before-break" solution, in which software containers for a "new job" may be deployed to a node before the software containers of an existing or "old job" are "turned-off." Software containers for both jobs (i.e., the existing or "old job" and a "future" or "new job") may be deployed concurrently in the same node, and the software container(s) for a new job may be "turned-on" before the container(s) supporting the existing/"old job" are "turned off." A network of moving things according to various aspects of the present disclosure may, for example, also support what may be referred to herein as a "progressive update," in which both versions of a job (i.e., "version 1" and "version 2") coexist. The amount of time that both versions of the job coexist may be determined from or depend upon, for example, the location and/or speed of the vehicle on which the existing job version (e.g., "version 1") resides and the new job version (e.g., "version 2") will reside, as well as, for example, possible road obstructions that may affect the amount of time a vehicle will take to arrive at a specific location, and/or a time at which the update of the job may need to be completed.

In a network of moving things according to aspects of the present disclosure, the expected contact time of, for example, a first network node (e.g., a node of a vehicle—a mobile AP), with a second network node (e.g., a node at a specific fixed geographic location—a fixed AP), (i.e., the amount of time during which a vehicle is within communication range with/able to contact a specific AP), or the speed/direction/coordinates of a node-equipped vehicle may, for example, act as a trigger to change a configuration or state of a job. In accordance with various aspects of the present disclosure, a context change may be done by performing a "Commit" of a particular software container for a job. The state of a running software container may, for example, be saved with what may be referred to herein as a "Commit" command. The "Commit" command allows a software container to pause execution of its software application, if a higher priority software container/application/process is triggered to execute. The exact details regarding controlling and monitoring a specific job may, for example, be dependent on the container engine used to implement these aspects of the present disclosure (e.g., Docker, Rkt, LXC, LXD, etc.). In accordance with various aspects of the present disclosure, an extra (e.g., stand-by) software container may be available on each node in the network, to quickly deal with suddenly changes of the node context. Such a "stand-by" software container may take less than a second to bootstrap and begin execution.

In accordance with various aspects of the present disclosure, to handle a situation in which one or more physical network nodes that are handling a specific job fail, the system may, for example, employ what may be referred to herein as a "keep-alive mechanism" in which each particular node of the job periodically (e.g., according to a regular or known time interval or time) notifies the VCO (e.g., VCO 715) of every software container running in that particular node. If a particular node of the job fails, the scheduler of the VCO recognizes the failure of that particular node, due to the failure of the particular node to report according to the regular or known time interval or time for the particular node, and therefore considers the particular node as being in a failed or fault state. The scheduler may then flag the failure in a database maintained by the VCO, and the scheduling algorithm may be run again, to ensure that there are at least a minimum set of operable nodes needed to run the application. The scheduler may, for example, deploy the job in an alternative node if necessary and possible.

In accordance with various aspects of the present disclosure, to handle the situation in which one or more software containers that belong to a specific job fail, the local control (e.g., controllers 721, 731 of FIG. 7) may detect the failure(s), may then "kill" the failed software container(s) (e.g., stop execution of the software application of the "killed" software container(s)), and may then attempt to run/re-start execution of killed software container(s) again.

A network of moving things in accordance with various aspects of the present disclosure may achieve a degree of redundancy to deal with failures by having multiple software containers/nodes running portions/applications of a Job, simultaneously. As noted herein, running simultaneous containers (i.e., containers having the same software application/Job portion) in a single node is possible; however doing so may only prevent failures due to software application errors while processing input data. To run software containers simultaneously in multiple different nodes may involve use of a form of load balancing between nodes, i.e., a "smart" client to distribute the computing load between network nodes. A network of moving things may include a library of software code that uses "container service discovery" to provide an interface to access other software containers in a fault-tolerant way. Additional details regarding "container service discovery" may be found in the discussion below.

In accordance with various aspects of the present disclosure, a customer/user/subscriber may be able to upgrade a current version of a Job. As shown above in the discussion of the information elements/field of an example Job Description, the "Upgrade Policy" information element/field may, for example, provide for at least two different methods of update. In accordance with various aspects of the present disclosure, when a Job Description specifies an "Upgrade Policy" as performing a "Disruptive Update," the scheduler (e.g., scheduler 717) may not permit two versions of a single software application to run at the same time.

However, if the Job Description for a customer/user/subscriber specifies the "Upgrade Policy" as "Progressive," the scheduler may permit two versions of a single software application to coexist for a short period of time. The length of the short period of time may depend upon the software application. The two version of the software application (e.g., software containers 726, 727) may, for example, coexist until the new version of the software application (e.g., software container 727) bootstraps itself (e.g., starts up as from power up or reset, and reaches operational status). A way of determining whether the new software application version has completed bootstrapping itself may be to define an API endpoint, implemented by the new software application version (e.g., software container 727), and to which a software container controller (e.g., controller 721 of FIG. 7) may periodically send requests. Until the API endpoint of the new software application version (e.g., software container 727) returns a valid response to such a request, the software container with the new software application version (e.g., software container 727) may be considered to be unavailable, and both versions of the software application may coexist. In accordance with various aspects of the present disclosure, the software application of the existing software container (e.g., software container 726) may be terminated, either before or after the update, depending on the "Upgrade Policy" specified in the Job Description for the Job. Specifying an "Upgrade Policy" of a Job Description as "Progressive" may permit developers of software applications to run blue-green tests of two different versions of a single software application.

In a network of moving things in accordance with various aspects, if a Job fails, a container engine of a node on which the Job failure occurred (e.g., the container engine 725 of node 720 illustrated in FIG. 7) may restart the Job, if there are unused resource credits available for the customer/user/subscriber owner of the Job, for all of the resources used by the Job, during the current time period. Alternatively, the failed Job may be opportunistically rescheduled on a neighboring node (e.g., node 730). In accordance with various aspects of the present disclosure, a customer/user/subscriber may, for example, define a "Backup Job Description" that may be executed if the node on which the Job failure occurred cannot execute the current Job.

In accordance with various aspects of the present disclosure, a controller of a VCO (e.g., controller 717 of VCO 710) may attempt to match the current state of a node (e.g., node 720) with a desired state for that node. The controller of the VCO may trigger various actions in order to create, delete, and update Jobs. These actions may, for example, be communicated to (e.g., retrieved by) and executed by the controller of a node (e.g., either of the controllers 721, 731 of nodes 720, 730), which may then launch and/or terminate software containers. The controller of each node (e.g., controller 721 of node 720) in a vehicular network according to the present disclosure may maintain the Job Descriptions of the Jobs scheduled on that node (e.g., node 720). To accomplish the above, the actions triggered by the controller of the VCO (e.g., controller 717) may be communicated to each node (e.g., nodes 720, 730). In addition, nodes may fetch the images of the software container(s) needed to execute the Job (e.g., from database 713 or elsewhere in the network).

In accordance with various aspects of the present disclosure, customers/users/subscribers of the vehicular network may choose one of three job and image distribution priorities, which may be referred to herein as "BEST EFFORT," "OPPORTUNISTIC," and "EPIDEMIC." When the BEST EFFORT job and image distribution priority is specified, the network elements may use any of the communication technologies that are currently available. For example, if both cellular and Wi-Fi communication technologies are available, in accordance with aspects of the present disclosure, a node operating according to a "Best Effort" job and image distribution priority may choose to use a cellular network, even though Wi-Fi connectivity is available and less costly. When the OPPORTUNISTIC job and image distribution priority is specified, the network elements (e.g., nodes) may communicate with the destination entity only when a specified communication technology from a set of specified communication technologies is available. That is, in such a situation, a node will wait until the specified communication technology (e.g. DSRC) is available to provide connectivity from the node to the destination entity. Finally, when the EPIDEMIC job and image distribution priority is specified, the network element (e.g., node) may deliver a message to the next available networking neighbor, which will then be responsible for continuing the delivery of the message to its neighbor nodes, and so on, thereby transporting the message to the final destination.

In accordance with various aspects of the present disclosure, a VCO (e.g., VCO 710 of FIG. 710), when operating according to the EPIDEMIC job and image distribution priority, may send the Job Description in the form of a "torrent" file, using what is referred to herein as "gossip." The term "torrent" file may be used herein to refer to a file of information in which the contents of the file are stored in individual portions distributed across numerous nodes in a network. The portions of the file may then be retrieved/sent, in parallel, from/by various network nodes known to have the portions, and the portions of the file are then reassembled at the recipient. A torrent file operating in this manner may be considered to be a "static" torrent file.

A network according to various aspects of the present disclosure may employ/build "dynamic" torrent files, based on what may be referred to herein as a "gossip" protocol. For example, a "file mapping" that identifies a list of nodes that have the images of portions of a file may be "gossiped" in the network, and each particular node of the network may contribute to the "file mapping," information about file portions that the particular node knows about. Each particular node may employ a simple algorithm that (1) reviews the "file mapping" list and adds information about the image(s) that the particular node has; (2) removes entries in the "file mapping" that are for images of file portions identified as being at the particular node, but which the particular node does not have; and (3) adds the image(s) for file portions that the particular node expects other nodes to have. The third step of the algorithm may reduce the time needed the "file map" to converge to the actual location of file portions images, but may introduce errors (e.g., where image(s) may be expected to be on other nodes, but are not), corrections for which may involve further analysis. The torrent file carrying the Job Description is propagated by the nodes of the network. The use of a torrent file permits a node to fetch the software container image from other nodes of the network using, for example, cellular, Wi-Fi, DSRC, or any other suitable communication technology. This approach permits a network in accordance with aspects of the present disclosure to build a peer-to-peer software container image registry over a vehicular network. When all software container images required by a node for a given Job are available locally, at the node, the node controller (e.g., a controller such as controllers 721, 731 of FIG. 7) may then evaluate the Job Description and start the execution of the software container.

A node controller according to various aspects of the present disclosure (e.g., controllers 721, 731) may employ a container engine (e.g., container engines 725, 735) that may be similar in ways to container engines used by Docker, Rocket, and LXC/LXD, previously referenced above. Such a container engine may function in a manner that abstracts namespaces (e.g., for the Linux OS), and may implement aspects of a file system, system identifiers, inter-process communication, process IDs, network functionality, and isolation of user processes. A node controller according to aspects of the present disclosure may use what are referred to herein as "control groups" (a.k.a., "cgroups" in the case of a Linux environment) to limit, account for, and prioritize the available resources. Each software container (e.g., containers 726, 727, 736, 737) may contain an endpoint that may be employed for health checks, metadata updates, resource usage tracking and enforcement of limits, activity logging, and graceful job termination.

In accordance with various aspects of the present disclosure, a node controller (e.g., controllers 721, 731) may preempt one or more containers of running software applications to execute one or more containers of a different software application, when a designated event occurs. For example, a software container running at a high priority in a network element of an ambulance may be executed only when the ambulance is in an "emergency" mode, to force traffic lights along the route of travel of the ambulance to "green." In another example, a software container for a sensor data collector in a network element of a vehicle may be executed only when the vehicle is within the boundaries of a geographic region (e.g., a village, city, county, precinct, state, or country). In yet another example, a container of a software application that manages "epidemic" data transmission may be enabled only when another network node is nearby (e.g., within wireless communication range).

In accordance with various aspects of the present disclosure, each node controller of a node is paired with a respective node monitor, shown by the nodes 720, 730 of FIG. 7 each having a controller 721, 731 paired with a respective monitor 723, 733. The node monitors 723, 733 track the execution of respective containers of the nodes 720, 730 of FIG. 7 (containers 726, 727 and 736, 737), and may restart those monitored containers when the monitor detects that a software application of a container is failing or has failed. A monitor in accordance with aspects of the present disclosure may poll a "cgroup" or "hypervisor" periodically to retrieve statistics about each running container. If the monitor (e.g., monitors 723, 733) detects that a software application of a container is failing or has failed, the respective controller (e.g., controller 721, 733) may be triggered into taking action, and the failed container may thereby be restarted, provided that the "Fault Description" information element or field of the Job Description specifies a "Restart," as described above. In accordance with aspects of the present disclosure, a monitor (e.g., monitors 723, 733) may also push state and log information of each container to a VCO such as, for example, the VCO 710 of FIG. 7. Such data may, for example, be sent by the node using a communication technology according to a "BEST EFFORT," "OPPORTUNISTIC," or "EPIDEMIC" distribution priority. This allows the VCO of the vehicular network to log the state of software applications running on nodes of the network.

In accordance with various aspects of the present disclosure, software containers in nodes of a network of moving things may generate data to be stored or preserved. A VCO such as the example VCO 710 of FIG. 7 enables such containers to mount a local storage volume or a remote storage volume (RSV) (i.e., make the local storage volume or remote storage volume available to the software application(s) of the software container). In accordance with aspects of the present disclosure, the functionality of an RSV may first store the data to be stored by the software application locally, at the node, and may then synchronize the locally stored data with remote storage (e.g., a designated "folder" at a location remote from the node). Customers/users/subscribers may choose to synchronize the contents of local storage with remote storage using, for example, a "BEST EFFORT" or "OPPORTUNISTIC" distribution priority. In accordance with some aspects of the present disclosure, the concept of local and remote storage described above may be an abstraction that enables the integration with a delay-tolerant network (DTN), and facilitates management of data located on loosely connected nodes, such as the nodes in a vehicular network as described herein. In accordance with aspects of the present disclosure, a customer/user/subscriber may, for example, define three policies that may be referred to herein as "Termination Policies," which may be employed when containers terminate, whether graceful or not, and data has been stored locally on a file system of a node. A "Termination Policy" that may be referred to herein as "Delete" may, for example, cause all data written over the file system of a node to be erased at termination of the associated software container, while a "Termination Policy" that may be referred to herein as "Save" may cause all data written by the associated software containers into mounted volumes to be stored upon termination of the associated software container. A "Termination Policy" that may be referred to herein as "Send" may, for example, cause all data written by the associated software containers data to be collected, compressed, and sent to an RSV upon termination of the associated software container, using a communication technology consistent with an "OPPORTUNISTIC" distribution priority.

In a network in accordance with various aspects of the present disclosure, nodes may advertise their presence and what Jobs they are currently running and exposing. Each node of a network according to the present disclosure may run what may be referred to herein as a "Service Discovery" module. This software module may use a service discovery protocol including such as, for example, Domain Name System (DNS) service records (SRV), but may also employ a centralized distributed database, an IEEE std 802.11p Control Channel, a "gossip" communication strategy, and what may be referred to herein as "port-scanning." The term "port scanning" may be used herein to refer to the process of trying to connect to well-known "ports" or communication interfaces on, for example, a network node. Using that technique, a map may be created showing what services are running. The use of "gossip" may be a more interesting technique to employ in vehicular networks. In addition, a particular node of a network of moving things according to various aspects of the present disclosure may, for example, retrieve and cache the Job Description (described above) information of every Job running on each neighboring node (i.e., nodes within wireless communication range) of the particular node. The services discovered by each node of the network may, for example, be loaded into a "localhost DNS resolution (i.e., "Hosts") file" at the node, and that file may be structured according to a format of <service-name>.<namespace-name>. In the alternative, an implementation of a network of moving things may, for example, use "reverse proxy" or a local DNS server with short time-to-live (TTL).

In a network of moving things according to various aspects of the present disclosure, customers/users/subscribers may define a "network access control list (network ACL)" based on communication protocols, ports, IP addresses, and tags of software containers. By defining network traffic rules using tags, customers/users/subscribers are less likely to make mistakes and inadvertently permit illicit accesses to network elements. This approach simplifies provision of a network firewall, and may be implemented using, for example, what are referred to as "iptables," which are available in some operating systems (e.g., Linux). For example, in a situation in which two customers/users/subscribers/owners collect sensor data using distinct software applications that run in separated software containers, each customer/user/subscriber/owner may specify that any given software container may only be accessed by software containers of the same customer/user/subscriber/owner.

In a network of moving things in accordance with various aspects of the present disclosure, each customer/user/subscriber may have what are referred to as "resource credits," which have been discussed above. In one example, one resource credit may permit the use of a certain amount of CPU time, memory, or storage space during a certain time period. Operators/providers of the network may allow customers/users/subscribers to purchase prepaid credits, to limit the usage of the network resources, and may allow the customer/user/subscriber to pay for resources after consumption (i.e., "post-pay"). As previously discussed, above, the operator/provider of a network in accordance with aspects of the present disclosure may establish a price for prepaid resource credits that is lower than the price of "post-paid" resource credits, because doing so may help the operator/provider predict network usage.

In a network system according to the present disclosure, customers/users/subscribers may distribute their resource credits over the priority levels and timeframes that may best meet their needs. For instance, if an operator/provider offers better resource credit pricing during overnight hours, a customer/user/subscriber may allocate more resource credits to overnight hours, to permit sensor data processing to run faster. In accordance with various aspects of the present disclosure, the cost of resources used may be proportional to the priority set by the customer/user/subscriber. That is, a customer/user/subscriber consuming a resource at a higher priority level will be charged a higher amount of resource credits per unit of the resource than that charged for the same resource consumed at a lower priority level. Once the resource credits of the customer/user/subscriber are exhausted, the customer/user/subscriber Job may then be terminated. These mechanisms help operators/providers to optimize network resources usage and revenue, and distribute the customer/user/subscriber load over time. In accordance with various aspects of the present disclosure, a monitor (e.g., monitors 723, 733 of FIG. 7) of each node may log the execution time and resources consumed by each customer/user/subscriber software container. Customers/users/subscribers may, for example, be required to reserve network resources for each of their Jobs. In addition, each VCO (e.g., VCO 710) may log job execution time and resource consumption across all network nodes, to enable the operator/provider to charge for total usage across the network.

In accordance with various aspects of the present disclosure, operators/providers may develop APIs to abstract the access to network resources such as, for example, a bus line, geographic location, sensor data, and/or access to network interfaces. These APIs may, for example, be encapsulated in the software containers of the present disclosure. By enforcing the security method defined above, operators/providers of networks of moving things in accordance with aspects of the present disclosure may easily permit or deny access to APIs shared by each software application. For example, by employing the concepts described herein, an API for accessing a garbage bin sensor may be made available and enabled for use only by garbage collection partners.

A network in accordance with various aspects of the present disclosure enables an operator/provider to offer a Vehicular Network as a Service (VNaaS), in which a multi-tenant infrastructure is managed using one or more APIs. While conventional solutions target cloud-based clusters that run few replicas of many applications on powerful and expensive machines, the VCO of a network of moving things according to various aspects of the present disclosure may orchestrate the running of a few applications replicated in thousands of loosely connected, lower-cost nodes having limited resources. The scheduling algorithm of the VCO may be configured to orchestrate the activities of the nodes of a vehicular network as described herein by taking into consideration not only the resources available, but also the context of the nodes of the vehicular network (e.g., node location, the network status, and vehicle status). In accordance with aspects of the present disclosure, the controller of a node may preempt execution of a first software container to allow the execution of a software application of a second software container, when the priority of the second software container is relatively higher than the priority of the first software container, and may perform scheduling with a timeframe.

In accordance with various aspects of the present disclosure, Job and software container image distribution may be asynchronous, opportunistic, and may use peer-to-peer communication algorithms. Services may be encapsulated in software containers, and may leverage simple network access policies to permit operators/providers to offer easy access to a vehicular network infrastructure. The functionality of a network according to aspects of the present disclosure permits operators/providers to roll out new network element hardware and upgraded operating systems with minimal impact on running software applications, and provides simplified and straightforward configuration of thousands of software applications across thousands or hundreds of thousands of nodes from a centralized location. Further, a network of moving things according to aspects of the present disclosure supports the collection of metrics such as, for example, CPU and memory usage, per software application, rather than only per node, while also providing aggregate network usage per customer/user/subscriber. A network in accordance with the present disclosure may be used to support what is referred to as "fog computing" or "edge computing," as well as a vehicular network as a service (VNaaS).

Figure 8:
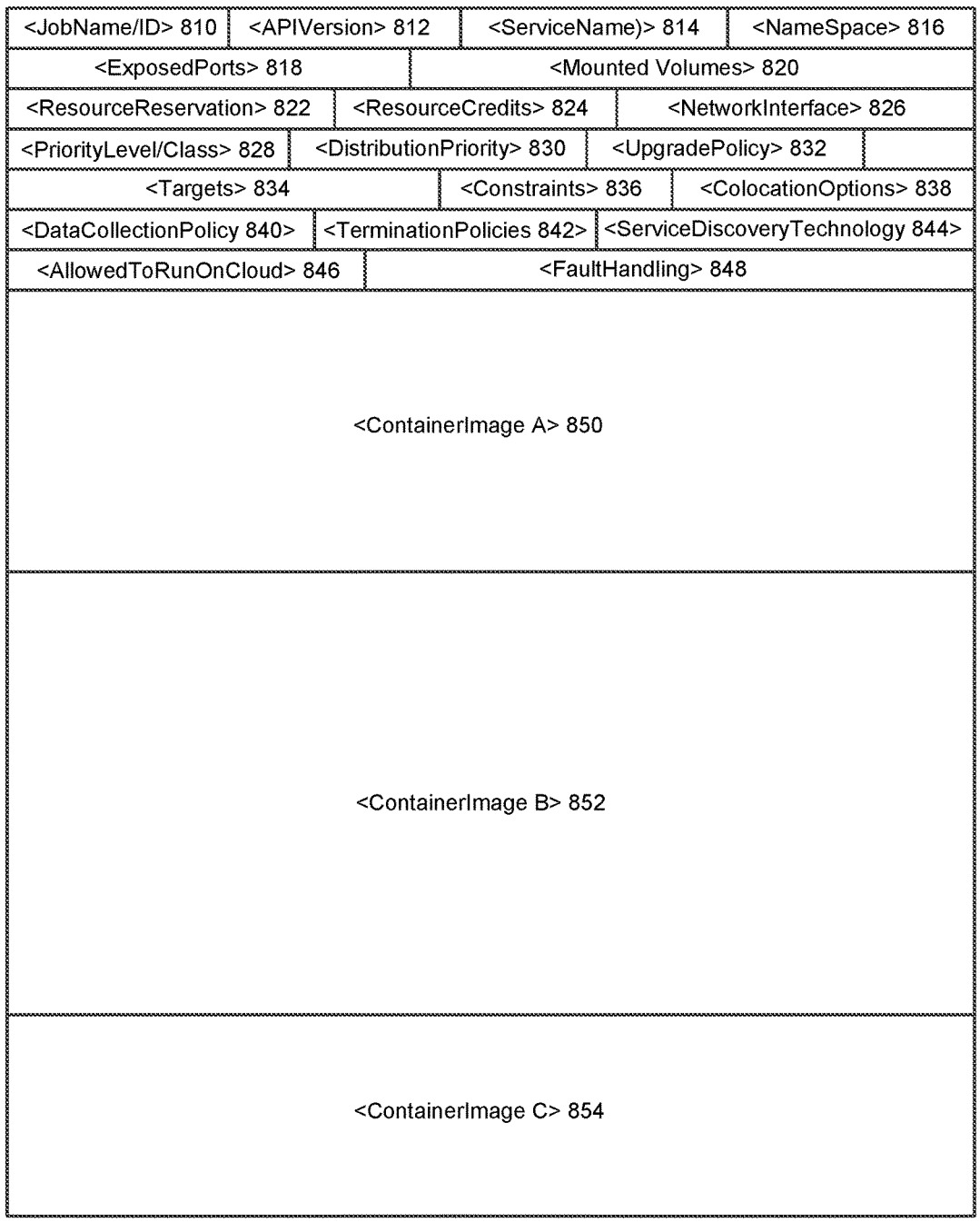
FIG. 8 is an illustration of an example Job Description, in accordance with various aspects of the present disclosure.

FIG. 8 is an illustration of an example Job Description 800, in accordance with various aspects of the present disclosure. As discussed above, a Job Description in accordance with aspects of the present disclosure may, for example, be used to identify one or more software applications of the software containers to be run on nodes of a vehicular network, and may, for example, include multiple information elements (e.g., "fields") such as the example information elements shown in FIG. 8 described below. The following discussion provides some examples of what kinds of information may be a part of a "Job Description" in accordance with aspects of the present disclosure. It should be noted that the example elements of a "Job Description" as provided herein are offered for purposes of illustration, and are not intended to represent limitations of the present disclosure, in that a lesser or greater number of the same, similar, or different elements may be a part of a "Job Description," without departing from the spirit and scope of the present disclosure.

A Job Description according to various aspects of the present disclosure may include, for example, information for one or more "container images" (e.g., software container images such as "ContainerImage A 850," "ContainerImage B 852," and "ContainerImage C 854," of FIG. 8), where each container image (e.g., containers 726, 727, 736, 737 of FIG. 7) is a package of software instructions, data, and/or parameters for one or more particular software application to be run by a node of a vehicular network such as, for example, the vehicular network (e.g., nodes 720, 730) of vehicular network 700. The illustrated example of FIG. 8 shows a number of different information elements or fields for various parameters/properties/information associated with software containers of a Job of a customer/user/tenant/subscriber of the network as described herein. It should be noted that the fields/properties/information elements discussed below and illustrated in FIG. 8 are for illustrative purposes only, and are not intended to limit the present disclosure in any way, as a greater or lesser number of the same or different fields/properties/information elements may be employed without departing from the spirit and scope of the present disclosure. It should also be noted that the graphical representation of each of the example fields/properties/information elements of FIG. 8, and the order of position, is not intended to provide an accurate representation of the size/amount/placement of memory/storage space occupied by each of the illustrated fields/properties/information elements of FIG. 8.

In accordance with aspects of the present disclosure, a Job Description may include a "Job Name/ID" field 810, which may identify the Job within the network, and an "API Version" field 812, which may identify the version of an API supported by the software applications of the containers of this Job.

A Job Description according to aspects of the present disclosure may include, for example, a "Service Name" field 814 that identifies the name of the service defined by container images of this Job.

In accordance with various aspects of the present disclosure, a Job Description may include, for example, a "Namespace" field 816, which may be used to identify a group of services provided by the Job.

A Job Description according to aspects of the present disclosure may also include, for example, an "Exposed Ports" field 818 that defines the Transmission Control Protocol (TCP)/User Datagram Protocol (UDP) ports of the container that are accessible from outside of the software container. This mechanism represents a base firewall aiming to isolate the container. In accordance with various aspects of the present disclosure, the example "Exposed Ports" field 818 may, for example, provide information to an O/S about what TCP/UDP port(s) of the software container is/are actually used by the software application(s) running on the software container, to enable the O/S to block ports that are not defined as "Exposed" by the Job.

In accordance with various aspects of the present disclosure, a Job Description may include, for example, a "Mounted Volumes" field 820, which may be used to identify the storage volumes, either local to or remote from the node, that may be made accessible by the software application(s) of the Job. In accordance with various aspects of the present disclosure, the example "Mounted Volumes" information may indicate whether reading and/or writing of the identified "volume(s)" is allowed and/or desired.

A Job Description according to various aspects of the present disclosure may include, for example, a "Resource Reservation" field 822 that may be used to reserve or allocate the resources of a node (e.g., CPU instructions/cycles/seconds/percentage, amount of program/data needed, and/or amount of storage needed) per period of time.

In accordance with various aspects of the present disclosure, a Job Description may include, for example, a "Resource Credits" field 824, which may specify a maximum amount of resource credits that may be consumed per period of time. The limits upon the amount of resource credits consumed may by identified by the time-of-day when resource credits may be consumed, and the limits may be partitioned by the resource consumed such as, for example, by CPU usage, amount of program/data space used, the amount of storage space used, and/or the amount of network bandwidth/data communication capacity used per period of time.

A Job Description according to various aspects of the present disclosure may include, for example, a "Network Interface" field 826 that may be used to specify various requirements and/or limits regarding the use of each communication interface of a node (e.g., cellular, Wi-Fi, DSRC, IEEE 802.11hr, and/or others). The information in the Network Interface field may, for example, include an "Enabled/

Disabled" parameter to control network access; "QoS" (i.e., quality of service) parameters including, by way of example and not limitation, information regarding priority, latency, bit rate, jitter, bit error rate, etc.; an "Address Configuration" parameter; and an "Access Control List (ACL)" that may specify protocol, port, source/destination IP addresses, and/or container ID/tags.

In accordance with various aspects of the present disclosure, a Job Description may include a "Priority Level/Class" field 828 that may, for example, be used to specify the priority of the software application(s)/container(s) of the Job. Various priority levels or classes may be specified that may represent, for example, a "low-priority," a "medium-priority," and a "high-priority" level at which the software application is to be run. For example, a software application that collects sensor data may have a "high priority" compared to other software applications running on a node. In such a situation, the software application running at "high priority" may be triggered and may preempt other running software applications running at a lower priority when, for example, the node running the software application is near another network node, or a sensor.

A Job Description according to various aspects of the present disclosure may include, for example, a "Distribution Priority" field 830 that may represent a level of urgency of communication of Job-related software, data, and/or parameter update information to the node(s). Such a field may allow use of multiple levels such as, for example, a level that represents use of a "Best-Effort" (i.e., via any communication means available), "Opportunistic" (i.e., when the opportunity to communicate with the intended recipient (e.g., node-to-node) arises), and/or "Epidemic" (i.e., communicate whenever and with whatever node is encountered) method of distribution. For example, critical security patches may need to be distributed immediately, while software application upgrades may be rolled out epidemically, to save on communication costs.

In accordance with various aspects of the present disclosure, a Job Description may include, for example, an "Upgrade Policy" field 832, which may contain values representing, by way of example and not limitation, a "Disruptive" and/or a "Progressive" upgrade policy. For example, an "Upgrade Policy" field of a Job Description may permit two versions of an application to run simultaneously during an update.

A Job Description according to various aspects of the present disclosure may include, for example, a "Targets" field 834 that may be used to identify the vehicular network nodes in which the software application is to run. The "Targets" field may identify a "Vehicular Network," a "Client," and/or may include "Other Tags" information that may, for example, identify nodes with a specific software version (e.g., "version=10").

In accordance with various aspects of the present disclosure, a Job Description may, for example, include a "Constraints" field 836, that may include information representing various constraints or conditions that are to be met before the software application may run. For example, possible constraints may include dates and/or time periods when execution of the software application is to/may occur, which may, by way of example and not limitation, indicate that a software application is to be executed during a short period at end of day to process daily data. Such constraints may relate to "geo-fencing," and may define geographic boundaries within or outside of which a software application may run, or the constraints may be those referred to herein as "execution triggers" that relate to, for example, "collision detection," "available communication network technology," and/or "changes in vehicle status." Constraints may also include, for example, things related to "vehicle status" such as the occurrence of an emergency situation, or aspects based on vehicle speed. For example, a "connection manager" may be unable to manage connections for a vehicle that is moving at a high speed. The "Constraints" field may also include information relating to the physical proximity of one node and another node.

A Job Description according to various aspects of the present disclosure may include, for example, an information field related to "Colocation Options" 838 such as, by way of example and not limitation, a "revoke list" of tags, which may be used to identify software applications that are not allowed to run simultaneously on a node.

In accordance with various aspects of the present disclosure, a Job Description may include, for example, a "Data Collection Policy" field 840. Additional details regarding this feature of a vehicular network of moving things according to the present disclosure are presented below.

A Job Description according to various aspects of the present disclosure may include, for example, an information field related to one or more "Termination Policies" 842 which may specify whether to delete, save, or send information (e.g., executable program code, data, parameters, data buffered for transfer to remote storage) associated with a software application, following termination of the software application.

In accordance with various aspects of the present disclosure, a Job Description may include, for example, a field that relates to "Service Discovery Technology" 844. Details of such information of a "Job Description" are discussed further, below.

A Job Description according to various aspects of the present disclosure may include, for example, an "Allowed To Run On Cloud" field 846, which may be used to indicate (e.g., Yes/No, True/False) whether a container of a Job may be offloaded from a node to functionality of the Cloud, for example, to have access to more resources.

In accordance with various aspects of the present disclosure, a Job Description may include, for example, a field that relates to "Fault Handling" 848, which may specify an action to be taken when a Job fails. For example, such a "Fault Handling" field may, for example, specify that a software application running on a node shall be restarted or rescheduled using another (e.g., different) Job Description. Options for fault handling control may represent, for example, that no action be taken (e.g., "None"), that the software application be restarted (e.g., "Restart"), or that the software application be rescheduled to another time at which it should run (e.g., "Reschedule").

Figure 9:
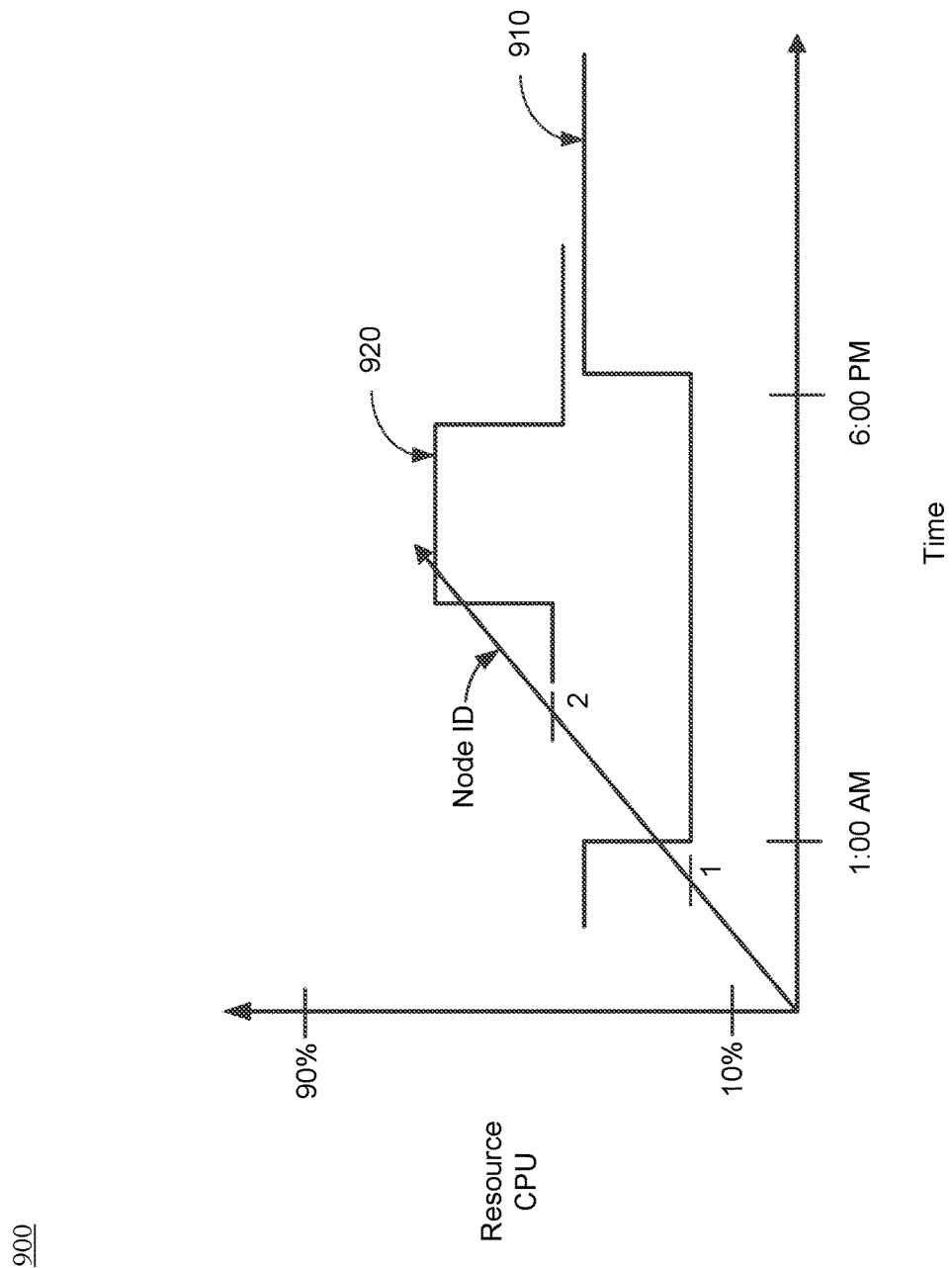
FIG. 9 shows an example chart illustrating allocation of a resource of nodes in a network of moving things that may correspond to, for example, a central processing unit (CPU) of each of the nodes of the vehicular network of FIG. 7, in accordance with various aspects of the present disclosure.

FIG. 9 shows an example chart illustrating allocation of a resource of nodes in a network of moving things that may correspond to, for example, a central processing unit (CPU) of each of the nodes 720, 730 of the vehicular network 700 of FIG. 7, in accordance with various aspects of the present disclosure. As shown in the example illustrated by FIG. 9, CPU usage allocation for a node 1 may be represented by a curve 910 showing the variation of CPU usage allocation for node 1 over a period of time, in which the CPU usage allocation drops during the hours of approximately 1:00 AM to approximately 6:00 PM. CPU usage allocation at a node 2, shown by curve 920, illustrates the variation of CPU usage allocation at node 2 rising at approximately 8:30 AM and dropping at approximately 4:30 PM. The chart 900 of FIG. 9 illustrates how customers/users/subscribers to the services provided by such a network may leverage the resource allocation and node filtering functionality provided by aspects of the present disclosure, to run the same software application in different nodes during different periods of time.

Figure 10:
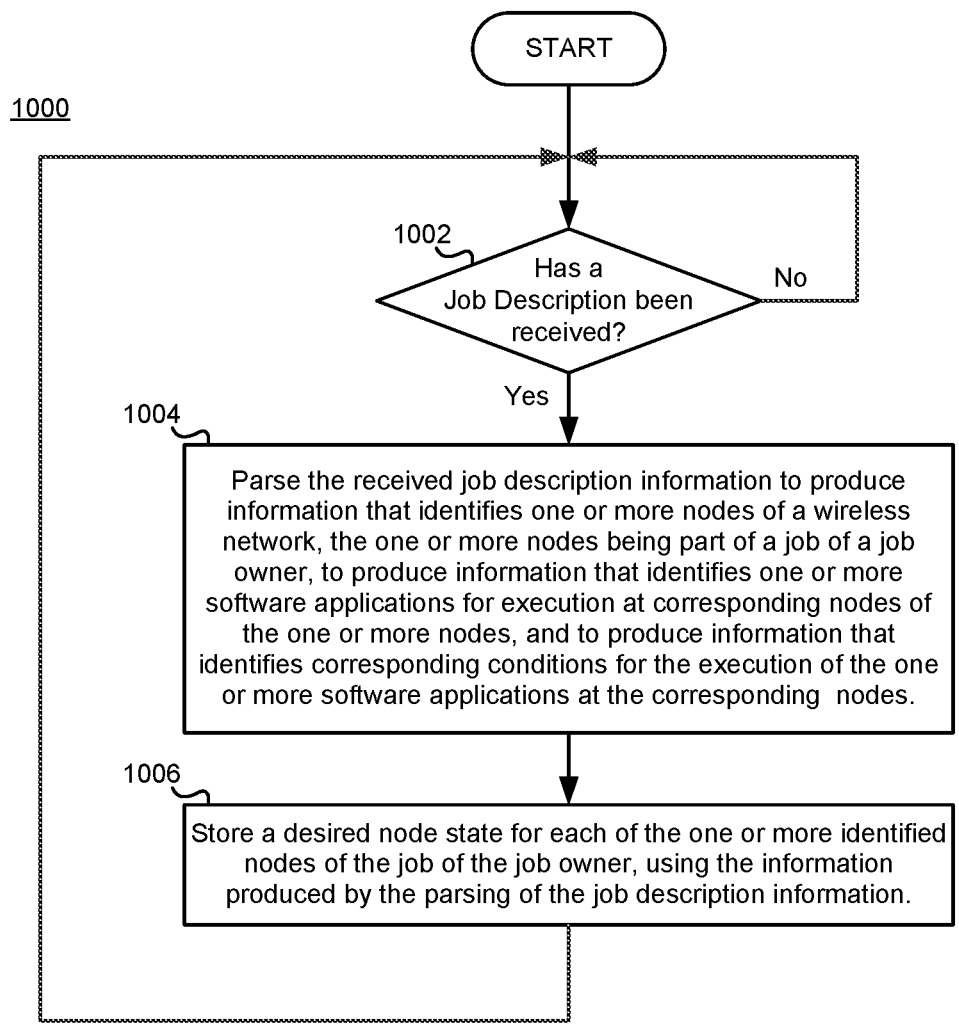
FIG. 10 shows a flowchart illustrating an example method of processing a job description used in remotely managing or orchestrating execution of one or more software applications residing in nodes of a wireless network, in accordance with various aspects of the present disclosure.

FIG. 10 shows a flowchart illustrating an example method of processing a job description used in remotely managing or orchestrating execution of one or more software applications residing in nodes of a wireless network, in accordance with various aspects of the present disclosure. The actions of the example method of FIG. 10 may, for example, be performed by elements described above and illustrated as the Cloud of FIG. 1, and may be performed as one or more software functions, subroutines, or processes that may run in parallel with other actions of a controller such as, for example, the vehicular container orchestrator 710 of FIG. 7. The network elements that perform the actions of FIG. 10 may, for example, share functionality and characteristics described with regard to the elements of any of the vehicular networks or elements shown or described with regard to FIGS. 1-9. The actions of FIG. 10 begin at block 1002.

At block 1002, a controller such as, for example, the example vehicular container orchestrator 710 illustrated in and discussed above with respect to FIG. 7, may determine whether a Job Description such as, for example, the example Job Description 800 illustrated in FIG. 8, has been received by the controller. An example Job Description in accordance with various aspects of the present disclosure was described in detail, above, with regard to FIG. 8. If, at block 1002, it is determined that a Job Description has not been received, the method may loop to continue waiting for the arrival of a Job Description. If, however, the controller performing the method of FIG. 10 determines that a Job Description has been received, the method then proceeds at block 1004, where the method parses the received Job Description to produce various information elements. For example, the parsing may produce information that identifies one or more nodes of the wireless network of the controller, where the one or more nodes are part of a job of a "job owner." The job owner may include, for example, a customer, client, user, or subscriber that uses the computational, storage, and/or communication resources of the nodes of the wireless network. The parsing may also produce information that identifies one or more software applications for execution at the nodes of the wireless network identified as part of the job in the Job Description. In addition, the parsing may produce information that identifies corresponding conditions for the execution of the one or more software applications at the nodes identified by information in the Job Description. In accordance with various aspects of the present disclosure, the one or more software applications may, for example, run in software containers on the identified nodes, where each software container may be described as a "self-contained execution environment" that includes, among other things, an operating system (OS), executable code of the one or more software applications, and environment variables and data used by the one or more software applications and the OS, and which may be quickly enabled to run and disabled from running on the node(s) on which the software container resides. Information (e.g., one or more "container images") of the software containers for a job may be present in the Job Description illustrated in and described above with respect to FIG. 8.

Next, at block 1006, a "desired node state" for each of the identified nodes may be derived/produced during or after the parsing of the Job Description may be stored in memory by the controller. The desired node state may be representative of, for example, a collection of one or more information elements, parameters, software applications and respective status information, network node and software application configurations and status, and/or other information that is representative of the desired state of the respective nodes on which computing, data storage, and communication resources are used by the job of a job owner. It should be noted that although the information derived/produced from the Job Description may represent a particular desired node state of each node that is part of the job, during operation of the nodes of the network, the node state of each node may be changed, autonomously, by the software/hardware/logic/circuitry of the identified network node(s) of the job, so that at any point in time, the current node state may be different from the desired node state. In accordance with various aspects of the present disclosure, the identified nodes of the job may report such changes in current node state, and other information, to a system such as, for example, a controller such as the example vehicular container orchestrator 710 of FIG. 7. The VCO 710 may use such information about the current node state, the desired node state, and other information for each of the identified nodes of a job, to then send/transmit/push/deliver information to the identified nodes in order to cause the identified nodes to change operation to the desired node state. For example, such information sent/transmitted/pushed/delivered to the identified nodes in which the current node state does not match the desired node state may include configuration information, new or updated software applications, parameters, data, and/or files, to enable the identified nodes to operate in their respective desired node states. Following completion of the actions described above with regard to block 1006, the method may then continue at block 1002, described above.

Figure 11A:
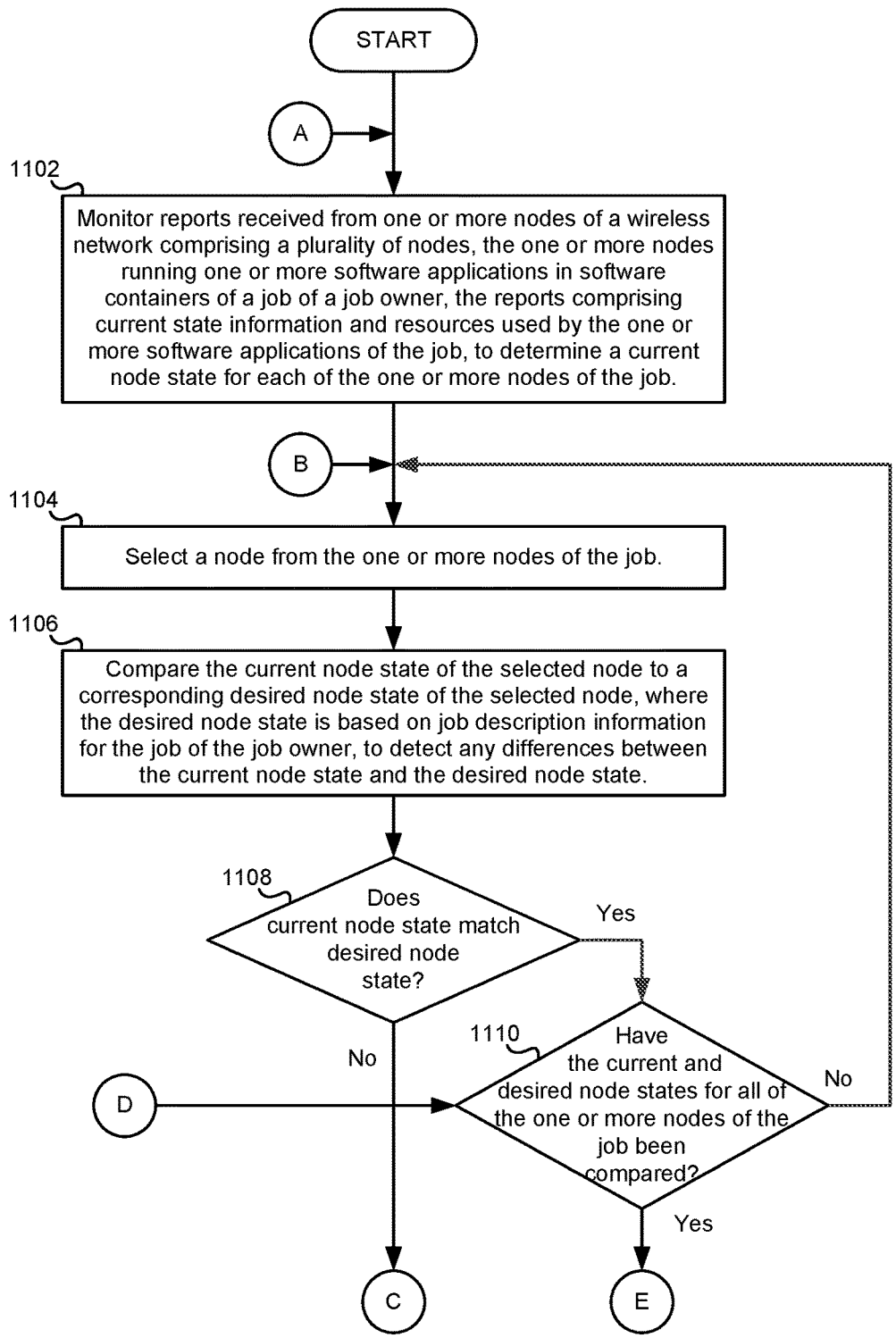
FIGS. 11A-11C show a flowchart illustrating an example method of remotely orchestrating execution of one or more software applications residing in software containers running in one or more nodes of a wireless network, in accordance with various aspects of the present disclosure.
Figure 11B:
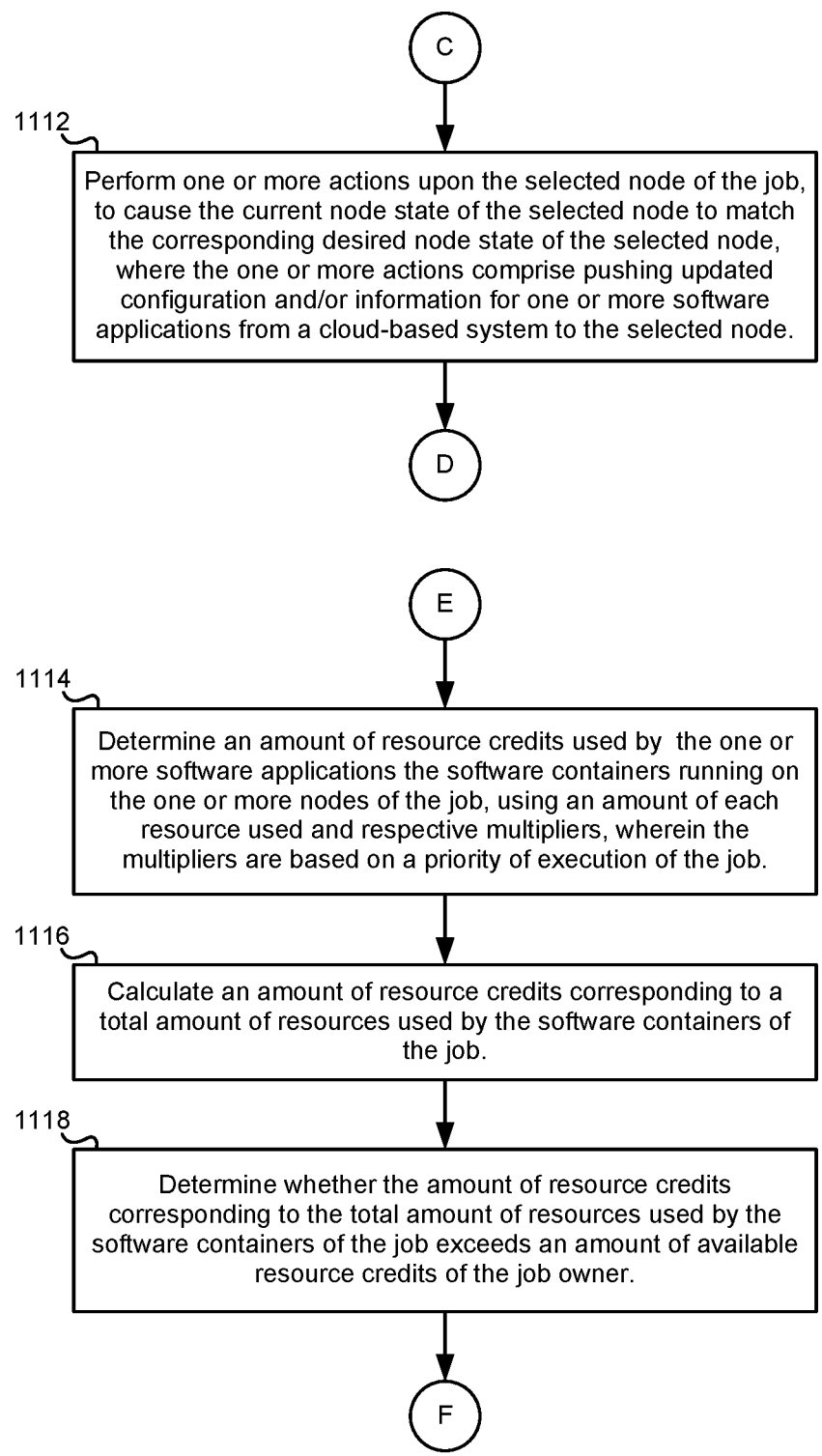
Figure 11C:
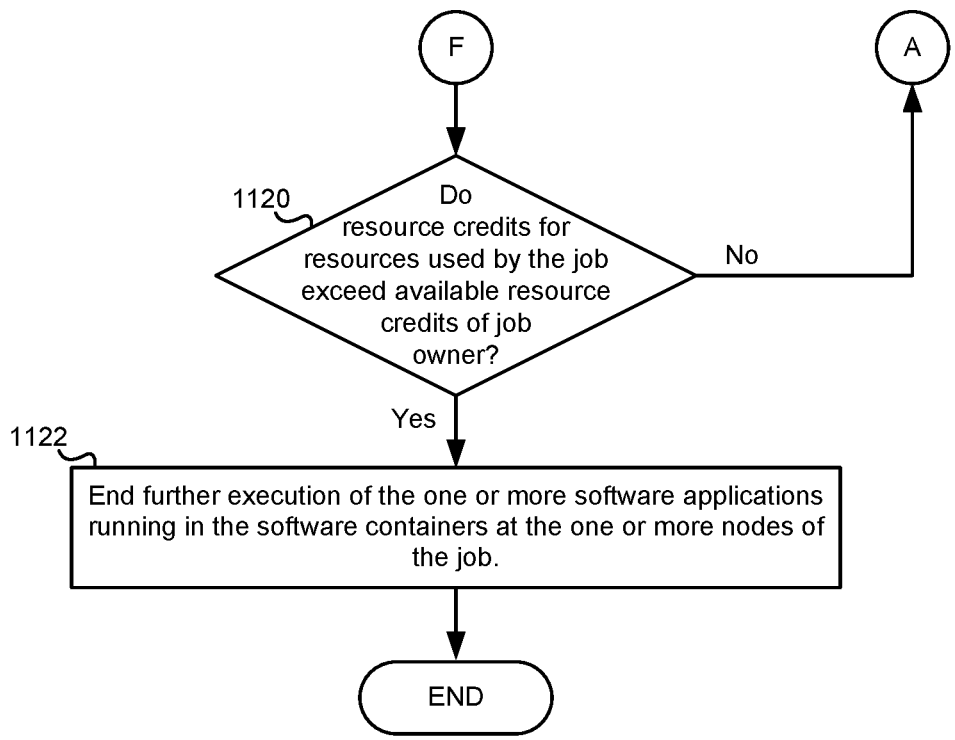

FIGS. 11A-11C show a flowchart illustrating an example method of remotely orchestrating execution of one or more software applications residing in software containers running in one or more nodes of a wireless network, in accordance with various aspects of the present disclosure. The actions of the method of FIGS. 11A-11C may be performed by, for example, a controller such as a vehicular container orchestrator 710 of FIG. 7, to coordinate or orchestrate the operation of software applications in software container(s) running on various nodes of a wireless network such as, for example, the wireless networks illustrated in and described above with respect to the systems/elements/methods of FIGS. 1-10. The example method illustrated in FIGS. 11A-11C begins at block 1102.

At block 1102, the method may monitor reports received from one or more nodes of a wireless network in accordance with the present disclosure, to determine a current node state for each of the one or more nodes of the job. In accordance with various aspects of this disclosure, the one or more nodes may be running one or more software applications in software containers of a job of a job owner. Such reports may comprise current state information and indications/amounts of resources used by the one or more software applications of the job.

Next, at block 1104, the method may select a node from the one or more nodes of the job, and may then, at block 1106, compare the current node state of the selected node to a corresponding desired node state of the selected node, to detect any differences between the current node state and the desired node state. The desired node state may, for example, be based on job description information for the job of the job owner, and may be as described above with regard to FIG. 10. Then, at block 1108, a determination may be made as to whether the current node state of the selected node matches the desired node state. If it is determined that the current node state of the selected node does not match the desired node state of the selected node, the method of FIGS. 11A-11C may then proceed to block 1112, described below. If, however, the current node state of the selected node does match the desired node state of the selected node, the method continues at block 1110, where a determination may be made as to whether all of the desired node states and current node states of all of the nodes of the job have been compared. If the current and desired nodes states of all of the nodes of the job have not yet been compared, the method of FIGS. 11A-11C continues at block 1104, described above. If, however, it is determined that the current and desired node states of all of the nodes of the job have been compared, the method may proceed to block 1114, shown at FIG. 11B.

At block 1112, the method may perform one or more actions upon the selected node of the job, to cause the current node state of the selected node to match the corresponding desired node state of the selected node. The one or more actions may comprise pushing/delivering/sending/transmitting, to the selected node, updated node configuration, software container configuration, and/or information (e.g., data, parameters, etc.) for one or more software applications (e.g., new software application(s) and/or updates for one or more software applications at the selected node) from a cloud-based system such as, for example, the VCO 710 of FIG. 7, and/or other systems located remotely from the nodes of the wireless network. After the actions of block 1112 are completed, the method may continue at block 1110, described above.

At block 1114, the method may determine an amount of resource credits used by the one or more software applications in the software containers running on the one or more nodes of the job. Such a determination may, for example, record amounts of each resource used by the activities of a job on one or more nodes of the wireless network, and may apply respective multipliers to the amounts of each resource used at each of the one or more nodes used, where the multipliers may be based on, for example, a priority of execution of the job on the one or more nodes of the wireless network. Resource credits in accordance with aspects of the present disclosure may be pre-purchased by a job owner, to prepay for the future use, or post-pay after use of computing, storage, and communication resources of the nodes of the wireless network described herein. The operator of the wireless network may determine the number of resource credits provided per unit of a currency of a country in which the wireless network is located, and may accept not only cash but various other forms of payment (e.g., credit card, personal/corporate check, etc.).

Next, at block 1116, the method may calculate an amount of resource credits corresponding to the total amount of resources used by the one or more software application in the software containers running on the one or nodes of the job. The amount/number of resource credits charged for the use of the computing, storage, and/or wireless communication resources of the wireless network of the present disclosure may, for example, be established by the operator of the wireless network according to, for example, the cost of operation/use of the wireless network infrastructure and nodes, and/or demand for use of the wireless network. Software applications that involve use of certain types of wireless communication resources such as, for example, cellular networks, may result in higher resource credit consumption when communication of data is performed, in comparison to, for example, data that is communicated using DSRC or Wi-Fi.

Next, at block 1118, the method of FIGS. 11A-11C may determine whether the amount of resource credits corresponding to the total amount of resources used by the software applications in software containers of the job exceeds an amount of available resource credits of the job owner. For example, a given owner of a job may arrange for a pre-payment of a certain currency amount, which may translate into a particular amount of resource credits available for use of the resources of the wireless network of the present disclosure, or a job owner may be extended a line of credit for a certain maximum amount of resource credits to be made available to the job owner. A system according to various aspects of the present disclosure may determine at regular intervals, or upon recognition of the occurrence of certain events in the nodes of the network (e.g., receipt of notice of the use of computing, storage, and/or wireless communication resources of a node of the job), the accumulated usage of the resources of the wireless network, and at that time, may determine whether the job of the job owner may continue to be served by the nodes of the wireless network.

Next, at block 1120, if the determination of block 1118 finds that the resource credits used according to the computing, storage, and wireless communication resources consumed by the job of the job owner do not exceed the available resource credits, the running of the software applications in the software containers of the job may be allowed to continue, and the method may therefore proceed to block 1102, described above. If, however, the resource credits used according to the computing, storage, and wireless communication resources consumed by the job of the job owner do exceed the resource credits available to the job owner, then the method may continue at block 1122, where the controller of the present disclosure (e.g., the example VCO 710 of FIG. 7) may take an action to end further execution of the one or more software applications running in the software containers at the one or more nodes of the job. Such an action may include, for example, a notification communicated to the one or more nodes of the job, where the notification identifies, for example, the one or more software applications, the software containers, the job owner, or any other suitable identifier that may be used by the node to appropriately stop the use of computing, storage, and/or wireless communication resources of the network nodes of the job for the job owner without available resource credits. In the illustration of FIGS. 11A-11C, the process coordinating/orchestrating the activities of nodes of the network may, for example, terminate activities with regard to the job of the job owner whose resource credits have run out.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller (NC), may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Various aspects of the present disclosure may be seen in a method of remotely orchestrating execution of one or more software applications residing in one or more nodes of a wireless network comprising a plurality of nodes, from a cloud-based system. Each node of the network may comprise storage for storing software containers for software applications residing at the node and at least one radio frequency interface for wirelessly communicating information with the plurality of nodes and the cloud-based system. Such a method may comprise receiving, at the cloud-based system, job description information representative of a job to be performed using computing and wireless communication resources of the one or more nodes; and parsing the received job description, at the cloud-based system, to produce information that identifies the one or more nodes, to produce information that identifies one or more software applications for execution at corresponding nodes of the one or more nodes, and to produce information that identifies corresponding conditions for execution of the one or more software applications at the corresponding nodes. The method may also comprise monitoring reports, received at the cloud-based system from the one or more nodes. The reports may comprise current node state information and resources used by the one or more software applications of the one or more nodes. In addition, the method may comprise comparing a current node state of a node selected from the one or more nodes to a corresponding desired node state of the selected node, where the desired node state may be based on the job description, to detect any differences between the current node state and the corresponding desired node state.

Such a method may further comprise performing one or more actions upon the selected node, if the current node state of the selected node does not match the corresponding desired node state, wherein the one or more actions comprise delivering one or both of updated configuration information and software application update information, from the cloud-based system to the selected node.

In accordance with various aspects of the present disclosure, the conditions for execution of the one or more software applications at the corresponding nodes may comprise a corresponding node being at a specified geographic location. The plurality of nodes may comprise one or more nodes located at a fixed geographic location and one or more mobile nodes that are enabled to move about a wireless coverage area of the network. Each software container of the job may comprise an operating system and execution environment information that enable control and monitoring of execution of the one or more software applications from the cloud-based system. Software containers of the job may be communicated from the cloud-based system to the corresponding one or more nodes, using the wireless network, and each node of the one or more nodes may be operable to locally change the current node state of the node according to network context information of the node.

In accordance with various aspects of the present disclosure, the method may further comprise determining an amount of resource credits used by the one or more software applications of the one or more nodes, using an amount of each resource used. The method may also comprise ending further execution of the one or more software applications of the one or more nodes, if the amount of resources credits used by the one or more software applications of the one or more nodes exceeds an amount of available resource credits for the job. Determining the amount of resource credits used by the one or more software applications of the one or more nodes may comprise multiplying an amount of each resource used by a respective multiplier, where the multiplier may be based on a priority of execution of the one or more software applications. Determining the amount of resource credits used by the one or more software applications of the one or more nodes may comprise calculating an amount of resource credits corresponding to a total amount of resources used by the one or more software applications of the one or more nodes; and determining whether the amount of resource credits corresponding to the total amount of resources used by the one or more software applications of the one or more nodes exceeds an amount of available resource credits of an owner of the job.

Further aspects of the present disclosure may be found in a non-transitory computer-readable medium having a plurality of code sections, where each code section has stored thereon a plurality of instructions executable by one or more processors. The plurality of executable instructions may cause the one or more processors to perform a method of remotely orchestrating execution of one or more software applications residing in one or more nodes of a wireless network comprising a plurality of nodes, from a cloud-based system. Each node of the network may comprise storage for storing software containers for software applications residing at the node and at least one radio frequency interface for wirelessly communicating information with the plurality of nodes and the cloud-based system. The steps of such a method may be as described above.

Additional aspects of the present disclosure maybe observed in a system for remotely orchestrating execution of one or more software applications residing in one or more nodes of a wireless network comprising a plurality of nodes, from a cloud-based system, where each node of the network may comprise storage for storing software containers for software applications residing at the node and at least one radio frequency interface for wirelessly communicating information with the plurality of nodes and the cloud-based system. Such a system may comprise one or more processors operatively coupled to the storage and to the at least one radio frequency interface, and the one or more processors may be operable to, at least, perform the steps of a method such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A method of remotely orchestrating execution of one or more software applications residing in one or more nodes of a wireless network comprising a plurality of nodes, from a cloud-based system, wherein each node of the network comprises storage for storing software containers for software applications residing at the node and at least one radio frequency interface for wirelessly communicating information with the plurality of nodes and the cloud-based system, the method comprising:

receiving, at the cloud-based system, job description information representative of a job to be performed using computing and wireless communication resources of the one or more nodes;

parsing the received job description, at the cloud-based system, to produce information that identifies the one or more nodes, to produce information that identifies one or more software applications for execution at corresponding nodes of the one or more nodes, and to produce information that identifies corresponding conditions for execution of the one or more software applications at the corresponding nodes;

monitoring reports, received at the cloud-based system from the one or more nodes, the reports comprising current node state information and resources used by the one or more software applications of the one or more nodes;

comparing a current node state of a node selected from the one or more nodes to a corresponding desired node state of the selected node, wherein the desired node state is based on the job description, to detect any differences between the current node state and the corresponding desired node state; and performing one or more actions upon the selected node, if the current node state of the selected node does not match the corresponding desired node state, wherein the one or more actions comprise delivering one or both of updated configuration information and software application update information, from the cloud-based system to the selected node.

2. The method according to claim 1, wherein the conditions for execution of the one or more software applications at the corresponding nodes comprise a corresponding node being at a specified geographic location.

3. The method according to claim 1, wherein the plurality of nodes comprises one or more nodes located at a fixed geographic location and one or more mobile nodes that are enabled to move about a wireless coverage area of the network.

4. The method according to claim 1, wherein each software container of the job comprises an operating system and execution environment information that enable control and monitoring of execution of the one or more software applications from the cloud-based system.

5. The method according to claim 1, wherein software containers of the job are communicated from the cloud-based system to the corresponding one or more nodes, using the wireless network.

6. The method according to claim 1, wherein each node of the one or more nodes is operable to locally change the current node state of the node according to network context information of the node.

7. The method according to claim 1, further comprising:
determining an amount of resource credits used by the one or more software applications of the one or more nodes, using an amount of each resource used; and
ending further execution of the one or more software applications of the one or more nodes, if the amount of resources credits used by the one or more software applications of the one or more nodes exceeds an amount of available resource credits for the job.

8. The method according to claim 7, wherein determining the amount of resource credits used by the one or more software applications of the one or more nodes comprises multiplying an amount of each resource used by a respective multiplier, and wherein the multiplier is based on a priority of execution of the one or more software applications.

9. The method according to claim 7, wherein determining the amount of resources credits used by the one or more software applications of the one or more nodes comprises:
calculating an amount of resources credits corresponding to a total amount of resources used by the one or more software applications of the one or more nodes; and
determining whether the amount of resource credits corresponding to the total amount of resources used by the one or more software applications of the one or more nodes exceeds an amount of available resource credits of an owner of the job.

10. A non-transitory computer-readable medium having a plurality of code sections, each code section having stored thereon a plurality of instructions executable by one or more processors to cause the one or more processors to perform a method of remotely orchestrating execution of one or more software applications residing in one or more nodes of a wireless network comprising a plurality of nodes, from a cloud-based system, wherein each node of the network comprises storage for storing software containers for software applications residing at the node and at least one radio frequency interface for wirelessly communicating information with the plurality of nodes and the cloud-based system, the steps of the method comprising:

receiving, at the cloud-based system, job description information representative of a job to be performed using computing and wireless communication resources of the one or more nodes;

parsing the received job description, at the cloud-based system, to produce information that identifies the one or more nodes, to produce information that identifies one or more software applications for execution at corresponding nodes of the one or more nodes, and to produce information that identifies corresponding conditions for execution of the one or more software applications at the corresponding nodes;

monitoring reports, received at the cloud-based system from the one or more nodes, the reports comprising current node state information and resources used by the one or more software applications of the one or more nodes;

comparing a current node state of a node selected from the one or more nodes to a corresponding desired node state of the selected node, wherein the desired node state is based on the job description, to detect any differences between the current node state and the corresponding desired node state; and performing one or more actions upon the selected node, if the current node state of the selected node does not match the corresponding desired node state, wherein the one or more actions comprise delivering one or both of updated configuration information and software application update information, from the cloud-based system to the selected node.

11. The non-transitory computer-readable medium according to claim 10, wherein the conditions for execution of the one or more software applications at the corresponding nodes comprises a corresponding node being at a specified geographic location.

12. The non-transitory computer-readable medium according to claim 10, wherein the plurality of nodes com- 13. The non-transitory computer-readable medium according to claim 10, wherein each software container of the job comprises an operating system and execution environment information that enable control and monitoring of execution of the one or more software applications from the cloud-based system.

14. The non-transitory computer-readable medium according to claim 10, wherein software containers of the job are communicated from the cloud-based system to the corresponding one or more nodes, using the wireless network.

15. The non-transitory computer-readable medium according to claim 10, wherein each node of the one or more nodes is operable to locally change the current node state of the node according to network context information of the node.

16. The non-transitory computer-readable medium according to claim 10, wherein the steps of the method further comprise:
determining an amount of resource credits used by the one or more software applications of the one or more nodes, using an amount of each resource used; and
ending further execution of the one or more software applications of the one or more nodes, if the amount of resources credits used by the one or more software applications of the one or more nodes exceeds an amount of available resource credits for the job.

17. The non-transitory computer-readable medium according to claim 16, wherein determining the amount of resource credits used by the one or more software applications of the one or more nodes comprises multiplying an amount of each resource used by a respective multiplier, and wherein the multiplier is based on a priority of execution of the one or more software applications.

18. The non-transitory computer-readable medium according to claim 16, wherein determining the amount of resources credits used by the one or more software applications of the one or more nodes comprises:
calculating an amount of resources credits corresponding to a total amount of resources used by the one or more software applications of the one or more nodes; and
determining whether the amount of resource credits corresponding to the total amount of resources used by the one or more software applications of the one or more nodes exceeds an amount of available resource credits of an owner of the job.

19. A system for remotely orchestrating execution of one or more software applications residing in one or more nodes of a wireless network comprising a plurality of nodes, from a cloud-based system, wherein each node of the network comprises storage for storing software containers for software applications residing at the node and at least one radio frequency interface for wirelessly communicating information with the plurality of nodes and the cloud-based system, the system comprising:
one or more processors operatively coupled to the storage and to the at least one radio frequency interface, the one or more processors operable to, at least:
receive, at the cloud-based system, job description information representative of a job to be performed using computing and wireless communication resources of the one or more nodes;
parse the received job description, at the cloud-based system, to produce information that identifies the one or more nodes, to produce information that identifies one or more software applications for execution at corresponding nodes of the one or more nodes, and to produce information that identifies corresponding conditions for execution of the one or more software applications at the corresponding nodes;
monitor reports, received at the cloud-based system from the one or more nodes, the reports comprising current node state information and resources used by the one or more software applications of the one or more nodes;
compare a current node state of a node selected from the one or more nodes to a corresponding desired node state of the selected node, wherein the desired node state is based on the job description, to detect any differences between the current node state and the corresponding desired node state; and
perform one or more actions upon the selected node, if the current node state of the selected node does not match the corresponding desired node state, wherein the one or more actions comprise delivering one or both of updated configuration information and software application update information, from the cloud-based system to the selected node.

20. The system according to claim 19, wherein the conditions for execution of the one or more software applications at the corresponding nodes comprise a corresponding node being at a specified geographic location.

21. The system according to claim 19, wherein the plurality of nodes comprises one or more nodes located at a fixed geographic location and one or more mobile nodes that are enabled to move about a wireless coverage area of the network.

22. The system according to claim 19, wherein each software container of the job comprises an operating system and execution environment information that enable control and monitoring of execution of the one or more software applications from the cloud-based system.

23. The system according to claim 19, wherein software containers of the job are communicated from the cloud-based system to the corresponding one or more nodes, using the wireless network.

24. The system according to claim 19, wherein each node of the one or more nodes is operable to locally change the current node state of the node according to network context information of the node.

25. The system according to claim 19, wherein the one or more processors are further operable to, at least:
determine an amount of resource credits used by the one or more software applications of the one or more nodes, using an amount of each resource used; and
end further execution of the one or more software applications of the one or more nodes, if the amount of resources credits used by the one or more software applications of the one or more nodes exceeds an amount of available resource credits for the job.

26. The system according to claim 25, wherein determining the amount of resource credits used by the one or more software applications of the one or more nodes comprises multiplying an amount of each resource used by a respective multiplier, and wherein the multiplier is based on a priority of execution of the one or more software applications.

27. The system according to claim 25, wherein determining the amount of resource credits used by the one or more software applications of the one or more nodes comprises:

calculating an amount of resource credits corresponding to a total amount of resources used by the one or more software applications of the one or more nodes; and determining whether the amount of resource credits corresponding to the total amount of resources used by the one or more software applications of the one or more nodes exceeds an amount of available resource credits of an owner of the job.

* * * * *